United States Patent
Luo

(10) Patent No.: US 8,328,372 B2
(45) Date of Patent: Dec. 11, 2012

(54) DISPLAY LIGHT SHIELD

(75) Inventor: Jin Luo, Shenzhen (CN)

(73) Assignee: Shenzhen Pchood Technology Co., Ltd, Shenzhen, Guangdong (CN)

( * ) Notice: Subject to any disclaimer, the term of this patent is extended or adjusted under 35 U.S.C. 154(b) by 251 days.

(21) Appl. No.: 12/448,268

(22) PCT Filed: Dec. 12, 2007

(86) PCT No.: PCT/CN2007/003552
§ 371 (c)(1),
(2), (4) Date: Jun. 12, 2009

(87) PCT Pub. No.: WO2008/071087
PCT Pub. Date: Jun. 19, 2008

(65) Prior Publication Data
US 2010/0020403 A1    Jan. 28, 2010

(30) Foreign Application Priority Data

Dec. 13, 2006  (CN) .......................... 2006 1 0157490
Jun. 4, 2007   (CN) .......................... 2007 1 0074727

(51) Int. Cl.
*G02B 27/00*    (2006.01)
(52) U.S. Cl. .................................................... 359/601
(58) Field of Classification Search .................. None
See application file for complete search history.

(56) References Cited

U.S. PATENT DOCUMENTS

| | | | | |
|---|---|---|---|---|
| 3,781,471 A * | 12/1973 | Hoffberger et al. | ........... | 348/842 |
| 4,097,902 A * | 6/1978 | Curnuck | ...................... | 348/842 |
| 4,314,280 A * | 2/1982 | Rose | .......................... | 348/842 |
| 4,321,726 A * | 3/1982 | Rogers et al. | ................... | 16/2.1 |
| 4,444,465 A * | 4/1984 | Giulie et al. | .................. | 359/601 |
| 4,828,513 A * | 5/1989 | Morrison et al. | ............. | 439/527 |
| 4,848,874 A * | 7/1989 | Mui et al. | ....................... | 359/609 |
| 4,863,242 A * | 9/1989 | Correa | .......................... | 359/601 |
| 5,818,635 A * | 10/1998 | Hohn et al. | .................. | 359/612 |
| 5,905,546 A * | 5/1999 | Giulie et al. | ................. | 348/842 |
| 5,966,241 A * | 10/1999 | Gilger | ........................... | 359/609 |
| 6,144,418 A * | 11/2000 | Kappel et al. | ................. | 348/834 |
| 6,462,277 B1 * | 10/2002 | Young et al. | .................... | 174/66 |
| D514,582 S * | 2/2006 | Dulberger | .................... | D14/449 |
| 7,303,077 B2 * | 12/2007 | Harlocker | .................... | 206/576 |

* cited by examiner

*Primary Examiner* — Derek S Chapel
(74) *Attorney, Agent, or Firm* — Raymond Y. Chan; David and Raymond Patent Firm

(57) ABSTRACT

A display light shield as a visor for a portable computer, includes a top portion and two side portions. The portions are sheet and jointed to form a hood whose sides and top are closed while bottom is open. The shape of the hood is suitable for the computer monitor. A fastener is provided on the hood for attaching the visor to the computer. The visor can be folded by changing joining manners of the portions so that packaging and transporting become convenient.

16 Claims, 30 Drawing Sheets

DISPLAY LIGHT SHIELD

BACKGROUND OF THE PRESENT INVENTION

1. Field of Invention

The present invention relates to a visor, and more particularly to a display light shield as a visor for CRT or LCD display, wherein the display light shield is adapted to be selectively adjusted to fit various models and sizes of the displays.

2. Description of Related Arts

The existing displays, such as computer monitors, include two major types which are CRT and LCD. During operation, the environment light and noise light projected on the screen of the display will disturb the visualization of the user. Using light shield can solve this problem effectively. But, there are only few displays built with light shield which are only designated for the particular models and sizes. Accordingly, the light shield has the following drawbacks. The light shield cannot be adjusted its height and width. The light shield cannot be adapted to different model and dimension of the displays which are produced by different manufacturers. The light shield occupies relatively much space during transportation so as to substantially increase the costs of the light shield. The light reducing effect of the inner surface of the light shield is not good enough to shield the light surrounding the display.

SUMMARY OF THE PRESENT INVENTION

In order to overcome the disadvantages of the existing light shields which cannot be generally used by CRT and LCD displays with different models and dimensions, the present invention provides a light shield with the adjustable application width, wherein within the range of adjustment, the display shield is applicable to CRT and LCD displays of different models and sizes, and it is easy to pack and transport.

Accordingly, in order to accomplish the objects, the present invention provides a display light shield, comprising: a main element and two supplemental elements connected with the main element at the two sides thereof respectively to form a hood body, wherein the main element and the supplemental elements are all in planar shape, and are connected to define a hood cavity of the hood body for encircling the periphery of the display, wherein the top and lateral sides of the hood cavity are shielded, and the bottom side of the hood cavity is opened. Accordingly, the inner side of the hood body is adapted to adjustably fit the shape of the display that the main element and the supplemental elements are coupled at the top peripheral edge and side peripheral edges of the display respectively.

At least one of the supplemental elements comprises a top engaging member provided as the top portion of the supplemental element and extended towards the main element, wherein the top engaging member is engaged with the main element by a retention unit to retain the supplemental element in position.

Accordingly, the supplemental elements are coupled at the main element, wherein each of the supplemental elements is selectively adjust its position with respect to the main element through the retention unit. Therefore, a distance between the supplemental elements is selectively adjusted via the retention unit for fitting the width of the display.

By incorporating the display light shield of the present invention with the existing display, the main element and the supplemental elements are coupled to form the hood body for encircling with the display. The width of the hood body can be selectively adjusted to fit the width of the display, such that the display light shield of the present invention can fit different sizes of the displays by adjusting the width of the hood body. In addition, since the main element and the supplemental elements are detachably coupled with each other, the display light shield is convenient to pack and transport by disassembling the main element and the supplemental elements. The packaging cost of the display light shield is also reduced.

Based on the embodiment mentioned above, the present invention can be improved.

Accordingly, at least one of the supplemental elements comprises a top engaging member provided at the top portion of the supplemental element and extended towards the main element, wherein the top engaging member is engaged with the main element by a retention unit to retain the supplemental element in position. With the above mentioned configuration, the width of the display light shield is adjusted by selectively adjusting the distance between the supplemental elements.

Additionally, the retention unit is selected from at least the following four alternatives.

The main element comprises an upper panel and a lower panel. The upper panel has a screw hole. The lower panel also has a corresponding screw hole aligning with the screw hole of the upper panel. The top engaging member of each of the supplemental element has a positioning slot, wherein the positioning slot is an elongated slot longitudinally formed on the supplemental element. A fastener is slidably extended from the screw hole of the upper panel to the screw hole of the lower panel through the positioning slot of the top engaging member, such that the respective supplemental element is securely locked between the upper and lower panels by the fastener and is slidably adjusted its position in responsive to the positioning slot.

Alternatively, the top engaging member of each of the supplemental elements comprises an upper panel and a lower panel. The upper panel has a screw hole. The lower panel has a corresponding screw hole aligning with the screw hole of the upper panel. The main element has a positioning slot, wherein the positioning slot is an elongated slot longitudinally formed on the main element. A fastener is slidably extended from the screw hole of the upper panel to the screw hole of the lower panel through the positioning slot of the main element, such that the main element is securely locked between the upper and lower panels by the fastener and is slidably adjusted its position in responsive to the positioning slot.

Alternatively, the top engaging member of each of the supplemental elements has a positioning slot, wherein the positioning slot is an elongated slot longitudinally formed on the top engaging member of the respective supplemental element. The main element has a screw hole aligning with the positioning slot. A fastener is slidably extended from the positioning slot of the supplemental element to the screw hole of the main element to securely lock up the supplemental element with the main element, wherein the supplemental element is slidably coupled with the main element to selectively adjust the position of the supplemental element with respect to the main element through the positioning slot.

Alternatively, the main element has a positioning slot, wherein the positioning slot is an elongated slot longitudinally formed at the main element. The top engaging member has a screw hole formed at the top engaging member of the supplemental element to align with the positioning slot. A fastener is slidably extended from the positioning slot of the main element to the screw hole of the supplemental element to securely lock up the supplemental element with the main element, wherein the supplemental element is slidably coupled with the main element to selectively adjust the position of the supplemental element with respect to the main element through the positioning slot.

In addition, the retention unit is selected from at least the following four different alternatives.

The main element comprises an upper panel and a lower panel overlapping underneath the upper panel, wherein the lower panel has a bolt protruding upwardly and aligning with a screw hole of the upper panel. The top engaging member has an elongated positioning slot aligning with the screw hole when the top engaging member is slidably sandwiched between the upper and lower panels, wherein the bolt is extended to the screw hole through the positioning slot and is secured by a nut to securely couple the top engaging member between the upper and lower panels in a slidably movable manner and to enable the top engaging member to adjustably slide in responsive to the positioning slot.

Alternatively, the top engaging member of at least one of the supplemental elements comprises an upper panel and a lower panel overlapping underneath the upper panel, wherein the lower panel has a bolt aligning with a screw hole of the upper panel. The main element has an elongated positioning slot aligning with the screw hole when the main element is slidably sandwiched between the upper and lower panels, wherein the bolt is extended to the screw hole through the positioning slot and is secured by a nut to securely couple the main element between the upper and lower panels in a slidably movable manner and to enable the main member to adjustably slide in responsive to the positioning slot.

Alternatively, the top engaging member of at least one of the supplemental elements comprises an elongated positioning slot, wherein the main element has a bolt extended to align with the positioning slot. The bolt is extended through the positioning slot and is secured by a nut to securely couple the top engaging member with the main element in a slidably movable manner and to enable the top engaging member to adjustably slide in responsive to the positioning slot.

Alternatively, the main element comprises an elongated positioning slot, wherein the top engaging member of at least one of the supplemental elements has a bolt protruded to align with the positioning slot. The bolt is extended through the positioning slot and is secured by a nut to securely couple the top engaging member with the main element in a slidably movable manner and to enable the main element to adjustably slide in responsive to the positioning slot.

Additionally, the retention unit is selected from at least the following two alternatives.

The main element has two sliding slots formed at the front and rear edges of the main element respectively. Alternatively, the main element has a sliding member and a sliding slot provided at the front and rear edges of the main element respectively. The distance between the two sliding slots is approximately the same as the width of the top engaging member of the supplemental element. Accordingly, the top engaging member of the supplemental element is slidably engaged with the main element through the sliding slots.

Alternatively, the top engaging member has two sliding slots formed at the front and rear edges of the supplemental element respectively. Alternatively, the top engaging member has a sliding member and a sliding slot provided at the front and rear edges of the supplemental element respectively. The distance between the two sliding slots is approximately the same as the width of the main element. Accordingly, the top engaging member of the supplemental element is slidably engaged with the main element through the sliding slots.

The locking component of the present invention is not limited as the above mentioned ten different alternatives. Methods of locking in multiple positions for connection provided by people skilled in arts are all available in the present invention, such as the multiple teeth locking structure used in cutter with retractable blade and the multiple pares of locking slots on the main element and supplemental elements.

In addition, at least one of the supplemental elements and/or said main element comprises a positioning member, wherein the positioning member has a height corresponding to a thickness of the periphery of the display.

The positioning member is protruded from an inner side of the supplemental element or is protruded from an inner side of the main element for retaining at the periphery of the display so as to retain the hood body in position.

The positioning member can stably position the hood body of the display light shield on the display to prevent it from sliding.

Additionally, the positioning member is in an elongated longitudinal shape. Accordingly, the positioning member is protruded from a side shielding member of the supplemental element as a side positioning member. The positioning member is also protruded from the top engaging member of the supplemental element as a top positioning member. The top and side positioning members are adapted for retaining at top and side peripheral edges of the display respectively.

A holding layer is provided at a contact point between the hood body and the periphery of the display for retaining the hood body in position, wherein the holding layer comprises a high-friction coefficient layer, a double-sided tape or glue, so as to retain the hood body at the display in a stable manner.

Accordingly, the high-friction coefficient layer is made of soft plastic or rubber, wherein a contacting surface of the holding layer is a rough surface. By incorporating with the anti-sliding structure, the display light shield can be attached on the display safely. It can avoid damaging the surface of the display by using tape.

In addition, a length-adjustable fastening belt, which is an elastic belt, is provided for securing the hood body with the display, wherein the fastening belt has one end coupling at the supplemental element or the main element and an opposed end forming as a hanger or a hook. The fastening belt can conveniently fasten the hood body of the display light shield to the display stably. One end of the fastening belt can be coupled with either the main element or the supplemental element.

In addition, the top engaging member of the supplemental element is an independent panel, wherein the side shielding member is coupling with the top engaging member by insertion, adhesion, screw and nut connection. When the side shielding member and the top engaging member are adapted to be disassembled to form two independent panels for easy packaging and transporting so as to save the packing space and reduce the shipping cost of the present invention.

In addition, the supplemental element has one or more breakable grooves spacedly formed at a bottom portion of the supplemental element, wherein the supplemental element is adapted to be selectively broken at one of the breakable grooves to remove the bottom portion below the breakable groove to adjust a height of the supplemental element corresponding to a size of the display. Therefore, the height of the display light shield can be flexibly adjusted to adapt to different types of displays.

A light non-reflective layer is provided at an inner side of the hood body, which is inner side of the main element and the supplemental elements, wherein the light non-reflective layer is formed as a black fur fiber layer for absorbing light ray and preventing light reflection. The light blocking layer can be coated or glued on the inner side of the hood body. The light blocking layer effectively reduces the inner surface of the display light shield to reflect the light from the display. Other reflection reducing materials are available at the present invention. For example: powder; matt paint; nylon, nylon, viscose, acrylic chemical fiber; natural animal and plant fibers; bamboo or carbon fiber. The following methods can be used to apply the above materials: paste, flocking, and spay.

In addition, the main element has a connection opening formed at a position aligning with an equipment interface or connector at a top peripheral edge of the display, and a cover detachably covering with the connection opening. Through the connection opening, the display can be connected with other equipment without removing the hood body from the display.

In addition, the left supplemental element comprises a left indention opening, and the right supplemental element comprises a right indention opening, wherein the left and right indention openings are facing towards each other. When the left and right top engaging members of the left and right supplemental elements are slidably coupled side-by-side, the left and right indention openings are aligned and coupled with each other to form an enlarged opening with the same size and position aligning with the connection opening of the main element. In this way, even the two top engaging members are close, or connected, the display can still be connected with other equipment without removing the hood body from the display.

The embodiments mentioned above can use the material selected from the following: the harmful gas and electromagnetic radiation absorbing charcoal materials; biodegradable plastic materials; high-strength carbon materials; carbon fiber woven materials; the implicational nano-technology materials; aluminum, aluminum-magnesium alloy and other light metal alloys; preservative treated thin iron materials, stainless steel, wave absorbing magnetic medium materials; wave absorbing dielectric polymer composite material; other electromagnetic radiation absorbing materials; plastic materials, such as: PET, EVA, PA, PPS, PC, PEFE, PU, PI, PEI, PEEK, LCP, PVDF, SPS, PPE, POE, PFA, plastic alloy, PES, PPO, POM, PBT, PMMA, K resin, AS, AES, EPS, PEI, PPA, MS, CPVC, EVOH, PI, CPE, PA66, PF, PA6T, PP-R, PA12, POP; starch; natural wood; wood fiber composite materials, animal fur products, paper products; aluminum-plastic composite materials.

The embodiments mentioned above can be fabricated through the following methods: injection molding, sewing, pasting, engraving, stamping, die-casting, cutting, silk screening These objectives, features, and advantages of the present invention mentioned above can be combined with each other for optimum effects.

DETAILED DESCRIPTION OF THE PREFERRED EMBODIMENT

Figure 1:
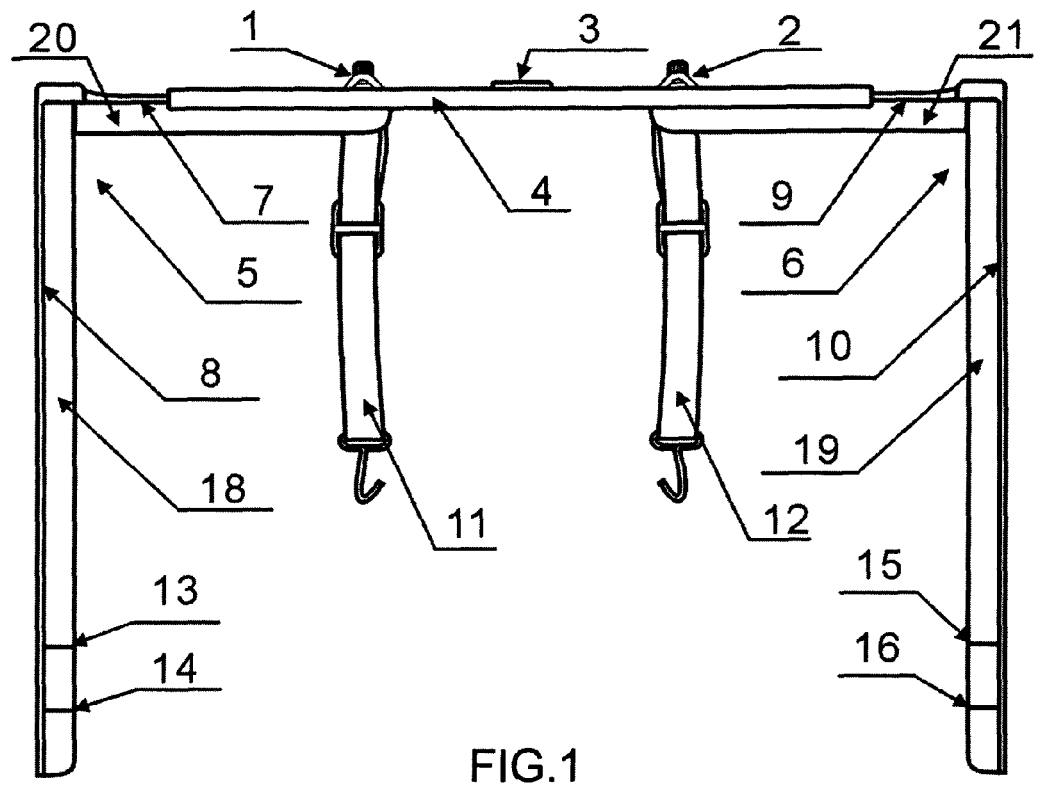
FIG. 1 is a front view of a display light shield according to a first preferred embodiment of the present invention.
Figure 2:
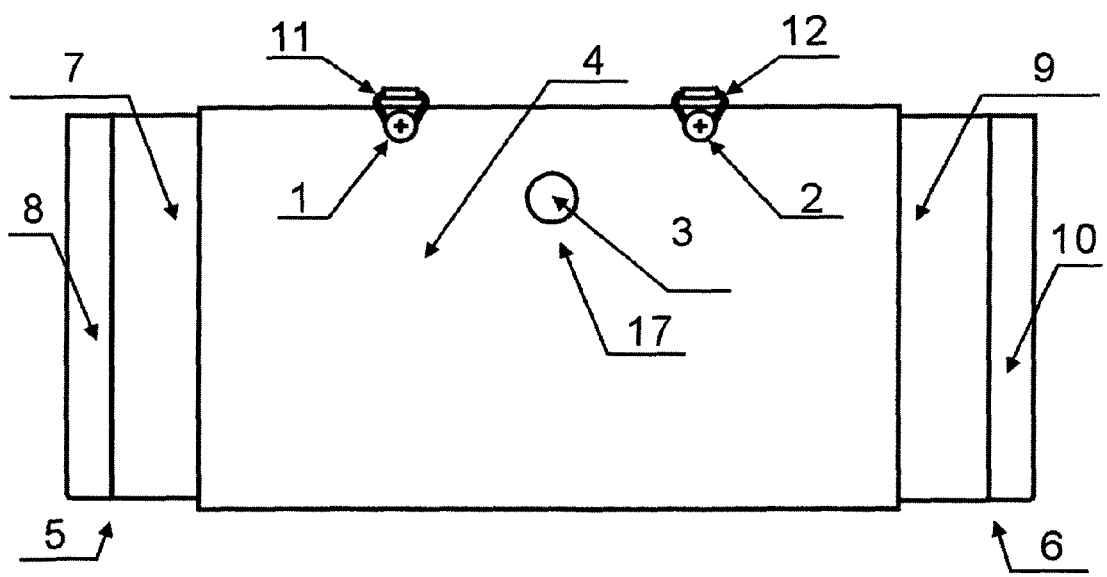
FIG. 2 is a top view of the display light shield according to the above first embodiment of the present invention.
Figure 10:
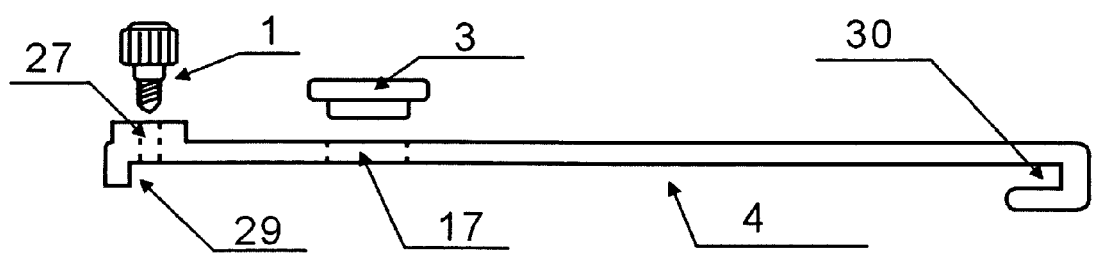
FIG. 10 is an exploded left view of the main element of the display light shield according to the above first embodiment of the present invention.

FIGS. 1 and 2 are front view and top view of the first embodiment of the present invention. Referring to FIG. 1, the display light shield comprises a main element 4, a left supplemental element 5, and a right supplemental element 6, wherein the left and right supplemental elements 5, 6 are coupled at two sides of the main element 4 to form a hood body. Each of the main element 4 and the left and right supplemental elements 5, 6 is formed in a planar shape. When the left and right supplemental elements 5, 6 are coupled at two sides of the main element 4 to form the hood body, the hood body has a hood cavity with an enclosed top, two enclosed sides, and an opened bottom. The size of the hood body is adapted to fittingly encircle with the periphery of the display at a position that two sides of the hood body are extended along the two side peripheral edges of the display respectively while the top side of the hood body is extended along the top peripheral edge of the display. In other words, the display is shielded within the hood cavity for preventing surrounding light projecting towards the display. The left supplemental element 5 comprises a left top engaging member 7 and a left side shielding member 8 as one side of the hood body extended therefrom edge-to-edge to form a L-shaped structure. The right supplemental element 6 comprises a right top engaging member 9 and a right side shielding member 10 as another side of the hood body extended therefrom edge-to-edge to form a L-shaped structure. Accordingly, the left and right supplemental elements 5, 6 are identical. The display light shield further comprises a fastening unit which comprises two fastening elements 11, 12 spacedly fastening at a rear portion of the main element 4 via two fasteners 1, 2, preferably two bolts, respectively. There are four breakable grooves 13, 14, 15, 16 spacedly and indently provided at the two supplemental elements 5, 6 respectively, such that each of the supplemental elements 5, 6 has two breakable grooves 13, 14, 15, 16 at the bottom portion thereof. Accordingly, each of the left and right side shielding members 8, 10 can be broken off along the breakable grooves 13, 14, 15, 16, such that the bottom portions of the left and right side shielding members 8, 10 below the respective breakable grooves 13, 14, 15, 16 are removed from the left and right side shielding members 8, 10. Referring to FIGS. 2 and 10, the main element 4 has a connection opening 17 formed at a position aligning with the equipment interface or connector at the top peripheral edge of the display such that the equipment interface or connector can be accessed through the connection opening 17 when the main element 4 is coupled at the top peripheral edge of the display. Correspondingly, a cover 3 is provided to detachably cover with the connection opening 7. As illustrated in FIG. 2, the connection opening 17 is covered by the cover 3. During installation, double sided tape can be applied at the area of the supplemental element 5, 6 where the surfaces will attach on the frame or periphery of the display. A holding layer of soft plastic material or a layer of rubber can be attached on this area, or glue is pasted for attaching the display light shield on to the display.

Figure 3:
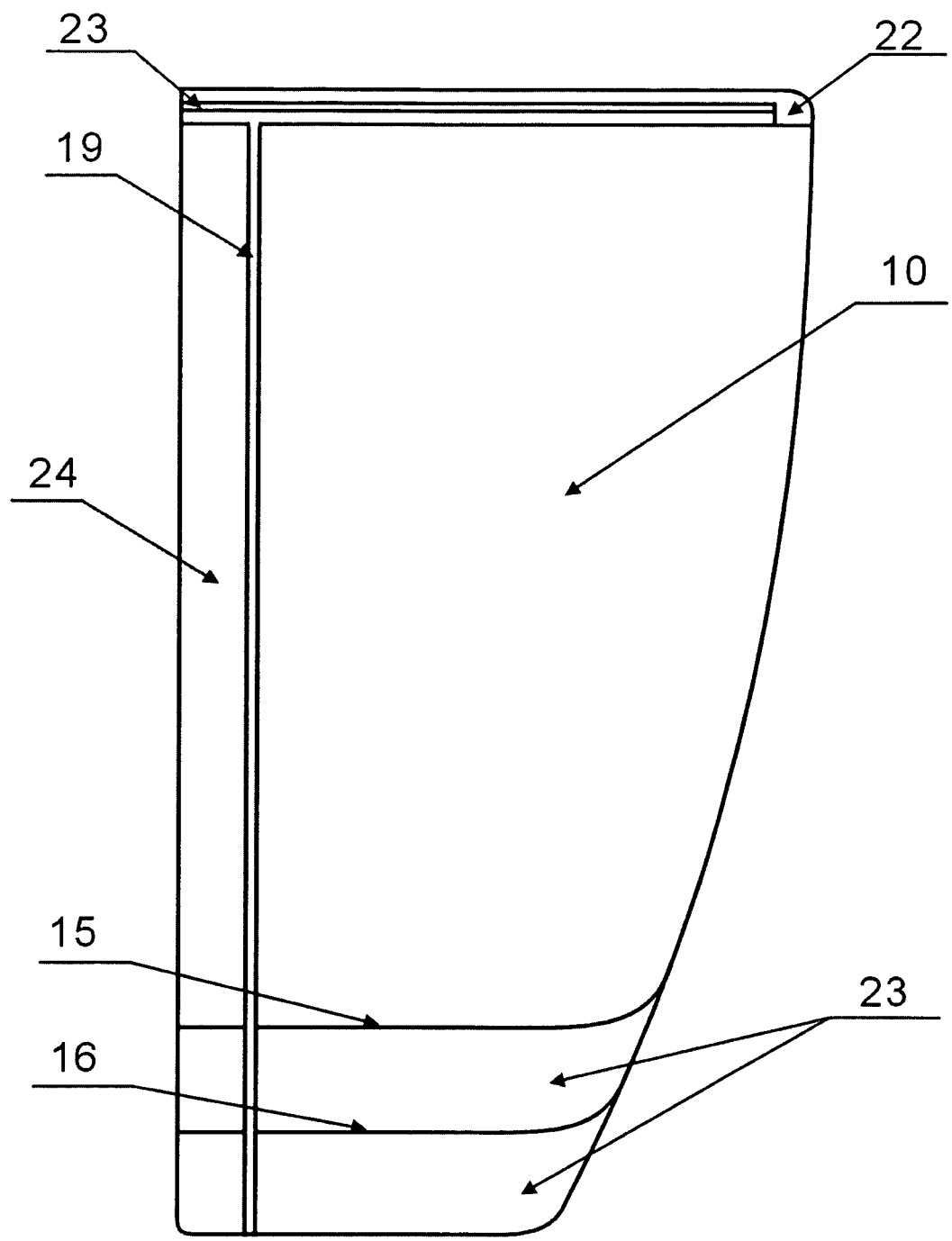
FIG. 3 is a left view of the right supplemental element of the display light shield according to the above first embodiment of the present invention.
Figure 4:
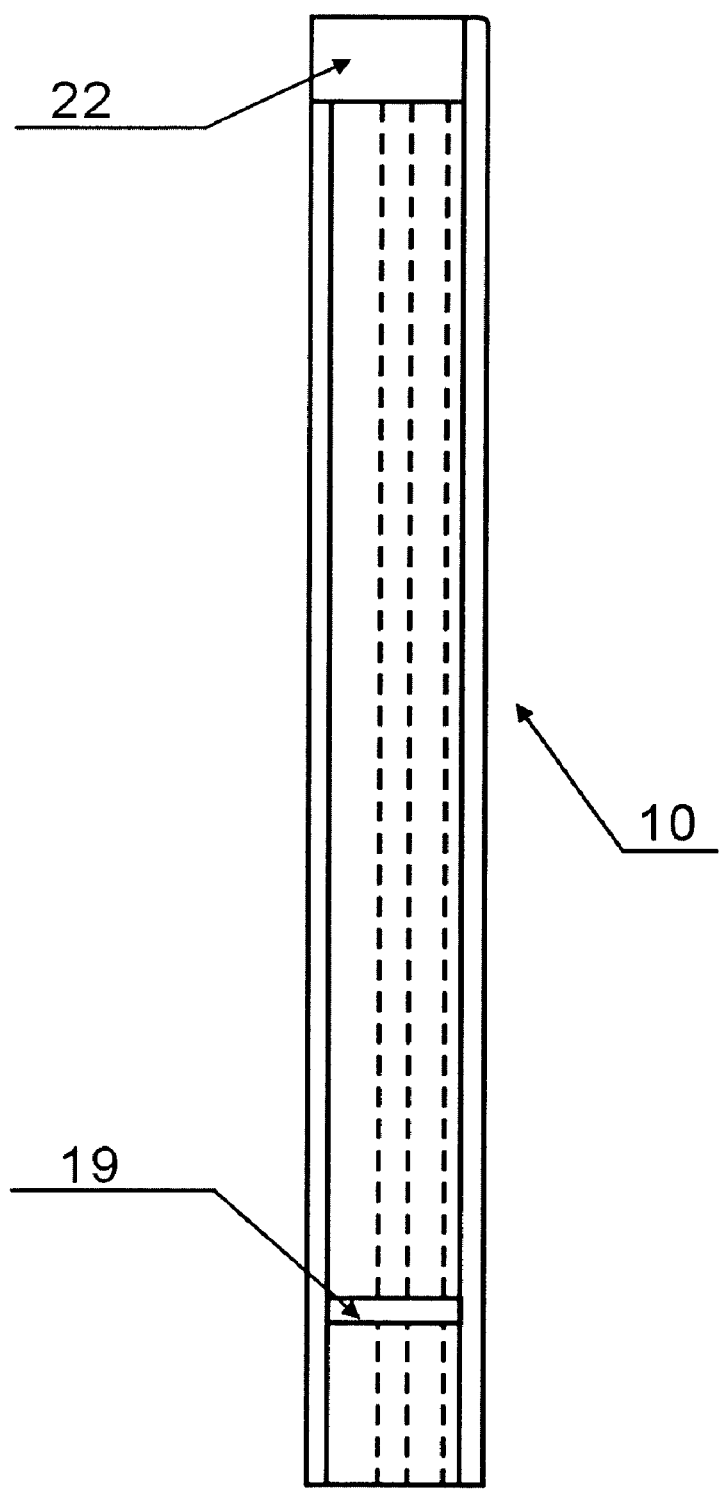
FIG. 4 is a bottom view of the right supplemental element of the display light shield according to the above first embodiment of the present invention.

FIGS. 3 and 4 are the left view and top view of the right side shielding member 10 of the right supplemental element 6 according to the first embodiment. The right side shielding member 10 of the right supplemental element 6 has a mortise slot 23 provided at the top portion thereof, wherein the mortise slot 23 has a stopper end 22 at the right end of the mortise slot 23. As it is mentioned above, the two breakable grooves 15, 16 are spacedly and indently formed at the bottom portion of the right side shielding member 10. Therefore, the bottom portion of the right side shielding member 10 is removed along one of the breakable grooves 15, 16 to selectively adjust the height of the right side shielding member 10 which is the height of the hood body.

The right side shielding member 10 also comprises black fur fiber layer provided on the inner surface thereof by flocking or pasting to absorb light ray and prevent light reflection. The right side shielding member 10 also comprises a side positioning member 19 perpendicularly protruded from the inner side of the right side shielding member 10. The side positioning member 19 is located away from the rear edge of the right side shielding member 10 to define a side edge holding portion 24 between the rear edge of the right side shielding member 10 and the side positioning member 19, wherein the side edge holding portion 24 has a width corresponding to the thickness of the side peripheral edge of the display. Therefore, the side peripheral edge of the display is fitted within the edge holding portion 24 of the right side shielding member 10 and is retained by the side positioning member 19.

Figure 5:
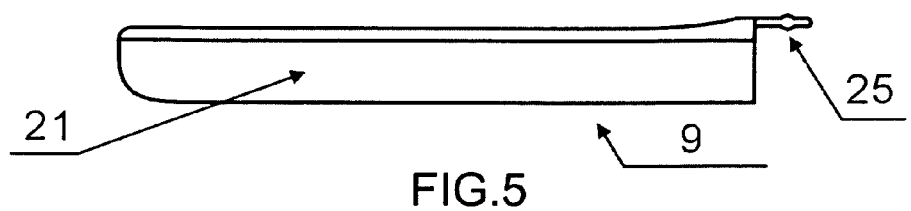
FIG. 5 is a front view of the right supplemental element of the display light shield according to the above first embodiment of the present invention.
Figure 6:
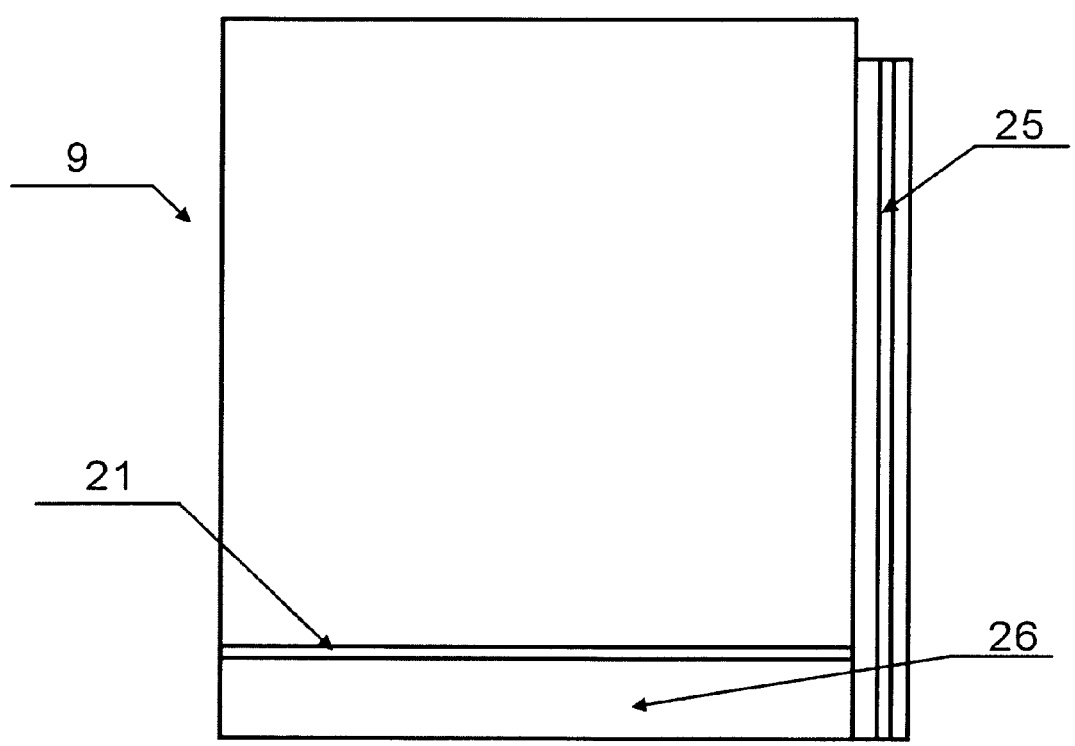
FIG. 6 is a top view of the right supplemental element of the display light shield according to the above first embodiment of the present invention.
Figure 7:
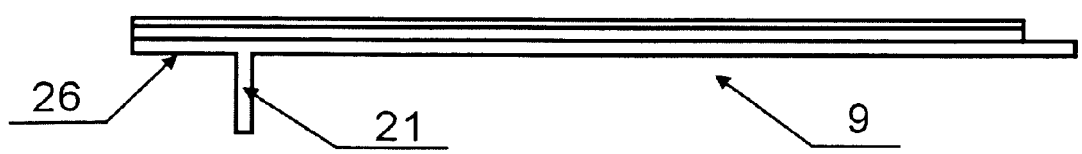
FIG. 7 is a left view of the right supplemental element of the display light shield according to the above first embodiment of the present invention.
Figure 8:
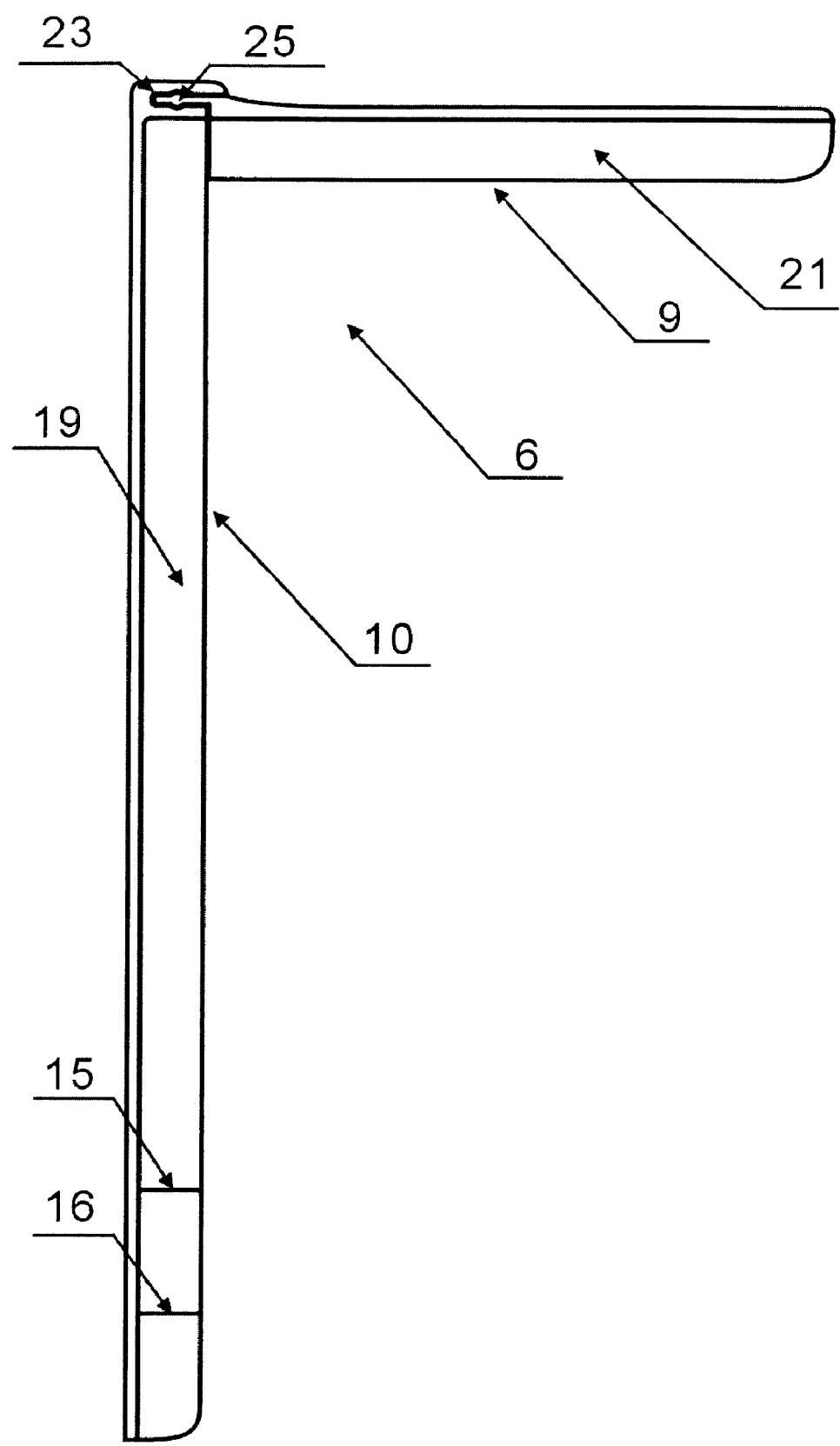
FIG. 8 is a rear view of the right supplemental element of the display light shield according to the above first embodiment of the present invention.

FIGS. 5, 6, and 7 are the front view, bottom view, and left view of the right top engaging member 9 of the right supplemental element 6 according to the first embodiment of the present invention. The right top engaging member 9 comprises a mortise and tenon structure 25 on the right end thereof adapted to couple with the mortise slot 23 of the right side shielding member 10. When the mortise and tenon structure 25 is slidably engaged with the mortise slot 23, the right top engaging member 9 is coupled with the right side shielding member 10 to form the top portion of the right supplemental element 6, as illustrated in FIG. 8. The right top engaging member 9 also comprises a top positioning member 21 perpendicularly extending from the bottom side of the right top engaging member 9 to define a top edge holding portion 26 between the rear edge of the right top engaging member 9 and the top positioning member 21, wherein the top edge holding portion 26 has a width corresponding to the thickness of the top peripheral edge of the display. Therefore, the top peripheral edge of the display is fitted within the top edge holding portion 26 of the right top engaging member 9 and is retained by the top positioning member 21.

FIG. 8 is the rear view of the right supplemental element 6 according to the first embodiment. The mortise and tenon structure 25 of the right top engaging member 9 is slidably engaged with the mortise slot 23 of the right side shielding member 10. So that the right top engaging member 9 and the right side shielding member 10 are coupled to form the right supplemental element 6. The breakable grooves 15, 16 of the right side shielding member 10 are spacedly and indently formed at the bottom portion through the side positioning member 19. Users can easily cut off the lower portion, including the positioning member 19 by a simple tool to adjust the height of the hood body.

Figure 40:
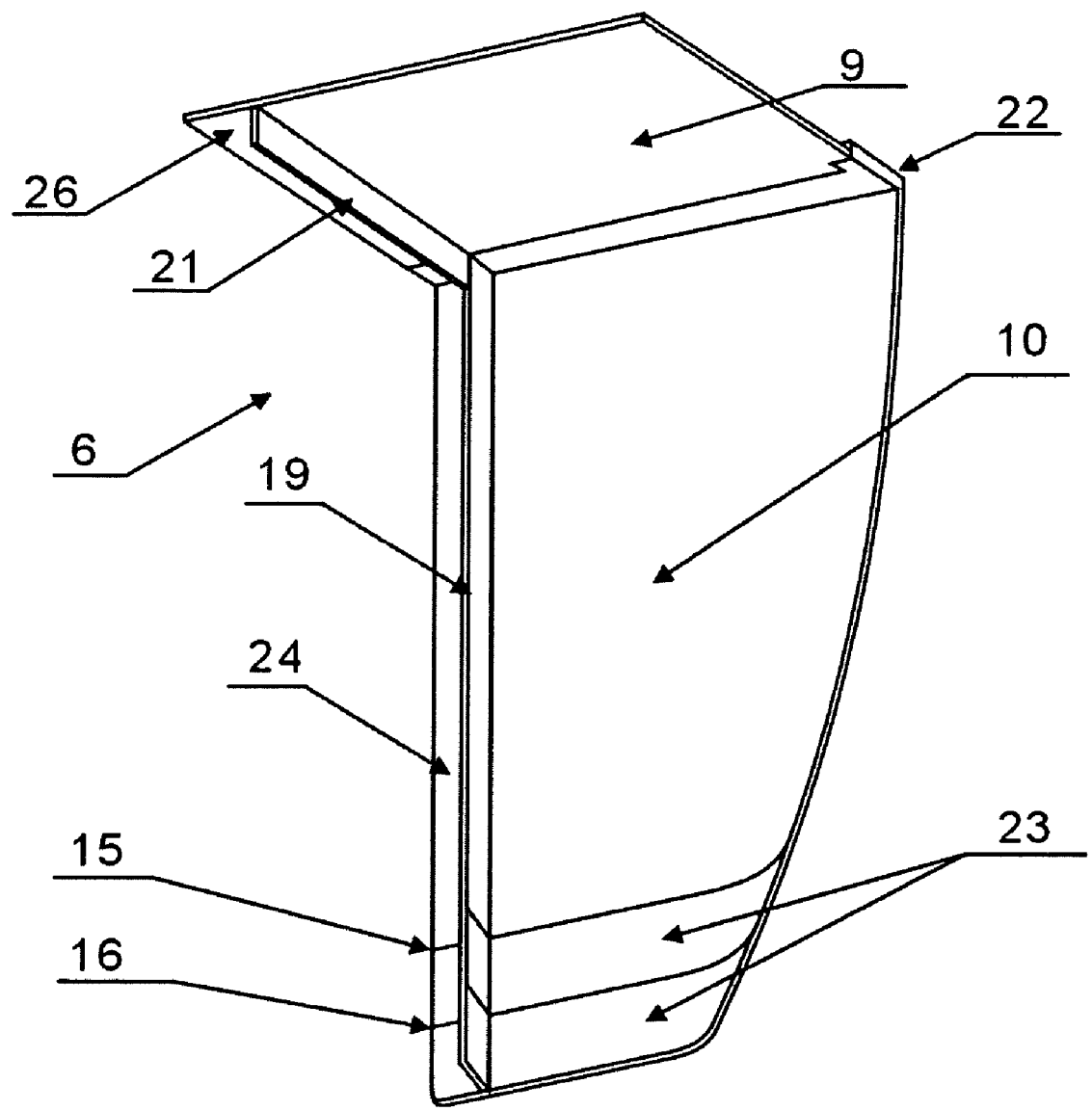
FIG. 40 is a perspective view of the right supplemental element of the display light shield according to the above first preferred embodiment of the present invention.

FIG. 40 is a perspective view of the right supplemental element 6 according to the first embodiment of the present invention.

Figure 9:
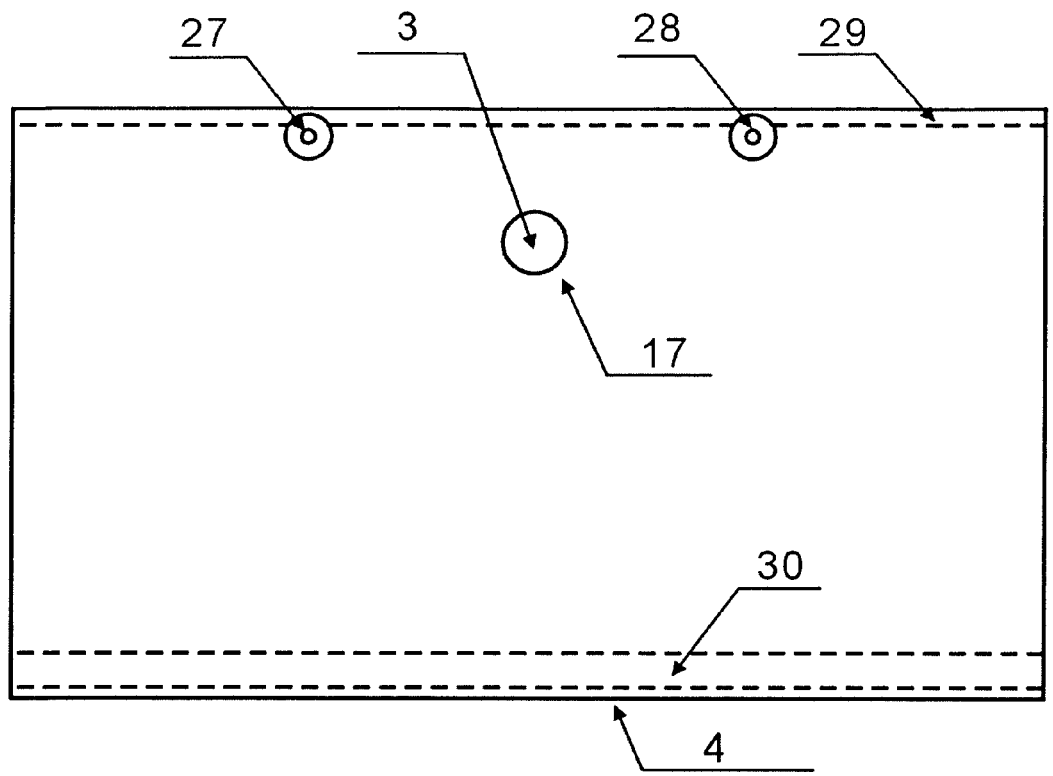
FIG. 9 is a top view of the main element of the display light shield according to the above first embodiment of the present invention.

FIG. 9 is the top view of the main element 4 according to the first embodiment. The main element 4 comprises two spaced apart screw holes 27, 28. The first screw hole 27 is engaged with a first fastener 1, and a second screw hole 28 is engaged with a second fastener 2. The two fasteners 1, 2 are used to fasten the elastic fastening elements 11, 12 respectively. The main element 4 also comprises a connection opening 17 and a cover 3 correspondingly. In FIG. 9, the connection opening 17 is covered by the cover 3. The position of the connection opening 17 is related to the equipment interface and connections of the display, such as the position of the USB port.

FIG. 10 is the left exploded view of the main element 4 according to the first embodiment. The first screw hole 27 is located at the main element 4, the first fastener 1 is able to be engaged with it. The connection opening 17 can be used for USB connection to the display. The corresponding cover 3 can be used to cover the USB connection. Referring to FIG. 10, the main element 4 comprises a sliding member 29 and a sliding slot 30 on the rear and front edge end respectively. The distance between the sliding member 29 and the sliding slot 30 is about the same as the width of the left and right top engaging members 7, 9. When the left and right top engaging members 7, 9 are placed between the sliding member 29 and the sliding slot 30, the left and right top engaging members 7, 9 and the main element 4 are engaged together at a position the left and right top engaging members 7, 9 are slidably engaged at two sides of the main element 4. The distance of the left and right supplemental elements 5, 6 can be adjusted be sliding the left and right top engaging members 7, 9 on the main element 4 according to the width of the display. In other words, the left and right supplemental elements 5, 6 can be slid towards each other until the side peripheral edges of the display fit between the left and right supplemental elements 5, 6. Referring to FIG. 9, the dotted line illustrates the position of the sliding member 29 and sliding slot 30 on the main element 4. The inner surface of the main element 4 is using light absorbing material or non-reflective material, such as black fur fiber flocked or posted which has a better effect. All the inner faces of the components of the hood body can use light absorbing material or non-reflective material, this is applicable in other embodiments of the present invention.

Figure 11:
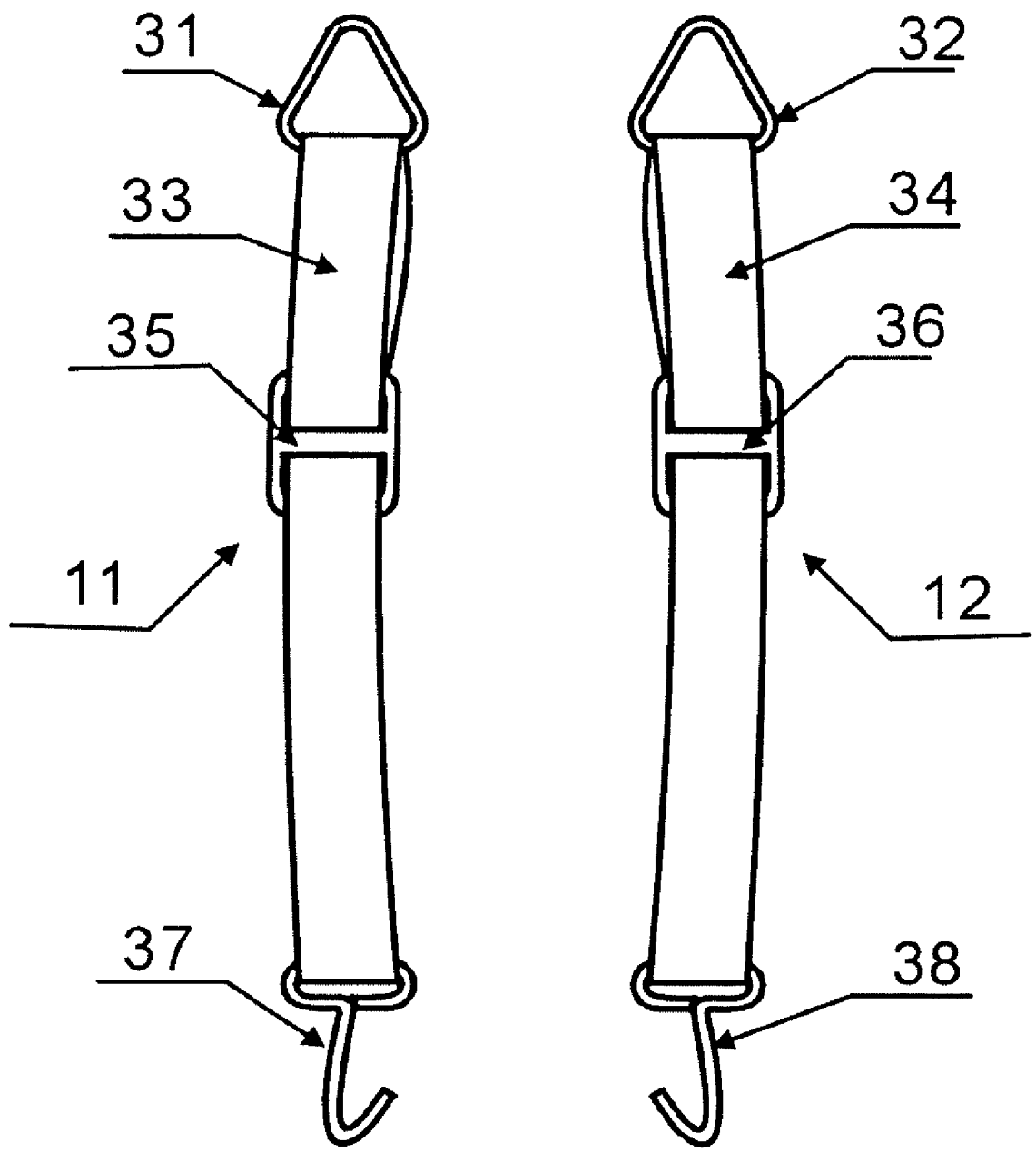
FIG. 11 is a front view of the fastening unit of the display light shield according to the above first embodiment of the present invention.

FIG. 11 is a front view of the fastening elements 11, 12, wherein each of the fastening elements 11, 12 comprises an elastic belt 33, 34, a metal button 31, 32 provided at one end of the elastic belt 33, 34, a length adjustor 35, 36 for selectively adjusting the length of the elastic belt 33, 34, and a metal hook 37, 38 provided at an opposed end of the elastic belt 33, 34. When the shield is used for LCD, the fastening elements 11, 12 can cross over the display stand downwardly and couple the two hooks 37, 38 together. When the shield is used for a CRT, the two hooks 37, 38 can be coupled with the cooling holes on the back of the display. Therefore, the shield can be fastened on the display to retain the hood body in position.

Figure 12:
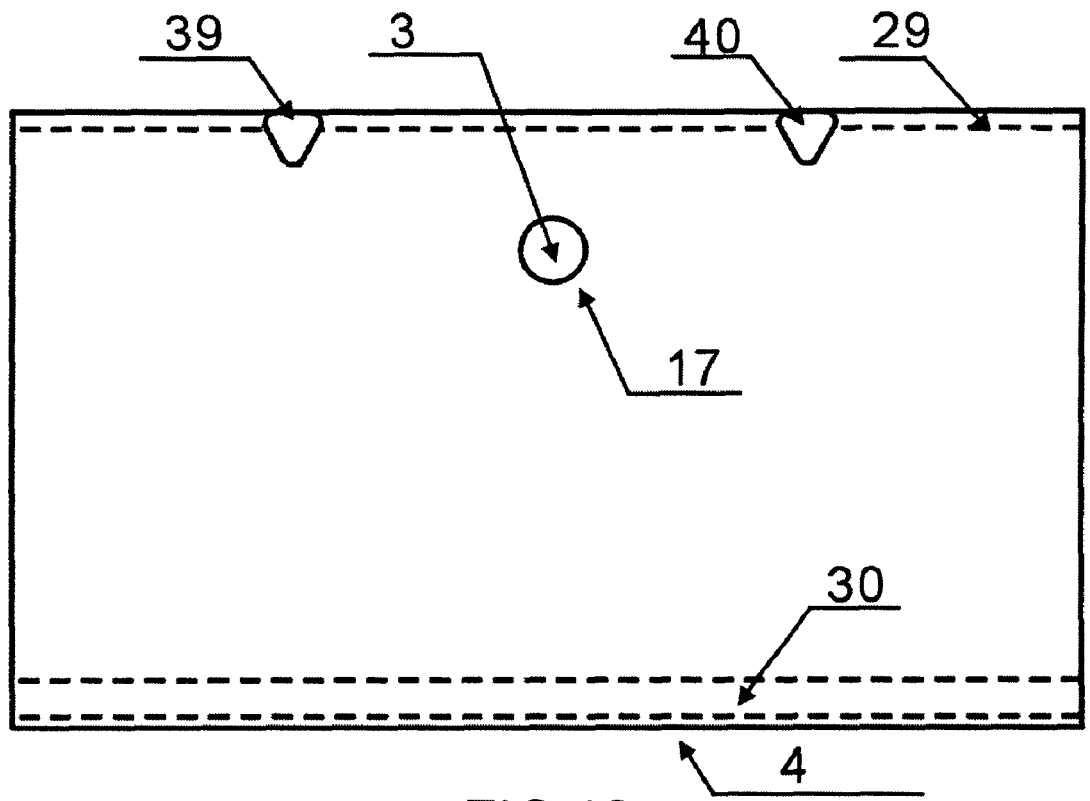
FIG. 12 is a top view of the main element of the display light shield according to a second preferred embodiment of the present invention.
Figure 13:
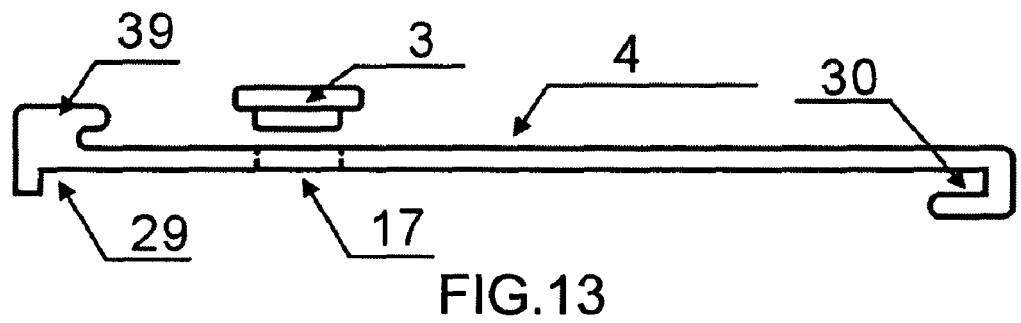
FIG. 13 is an exploded left view of the main element of the display light shield according to the above first embodiment of the present invention.

FIG. 12 is a top view of the main element 4 according to the second embodiment. FIG. 13 is the left exploded view of the main 4 according to the second embodiment. The main element 4 comprises two spaced apart protrusion 39, 40 having a triangular shape for connecting the fastening elements 11, 12. The main element 4 also comprises a connection opening 17 and a cover 3. The center component 4 comprises a sliding member 29 and a sliding slot 30 on the front end and rear end respectively. The left and right top engaging members 7, 9 can be slidably engaged between the sliding member 29 and the sliding slot 30 in different positions to adjust the distance between the two supplemental elements 5, 6 according to the width of the display.

Figure 14:
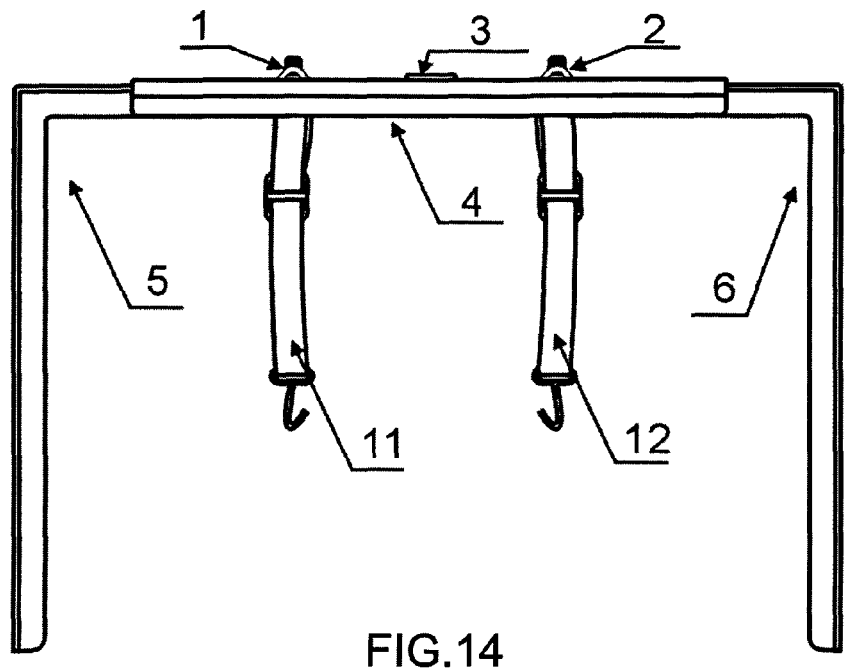
FIG. 14 is a front view of the display light shield according to a third preferred embodiment of the present invention.
Figure 15:
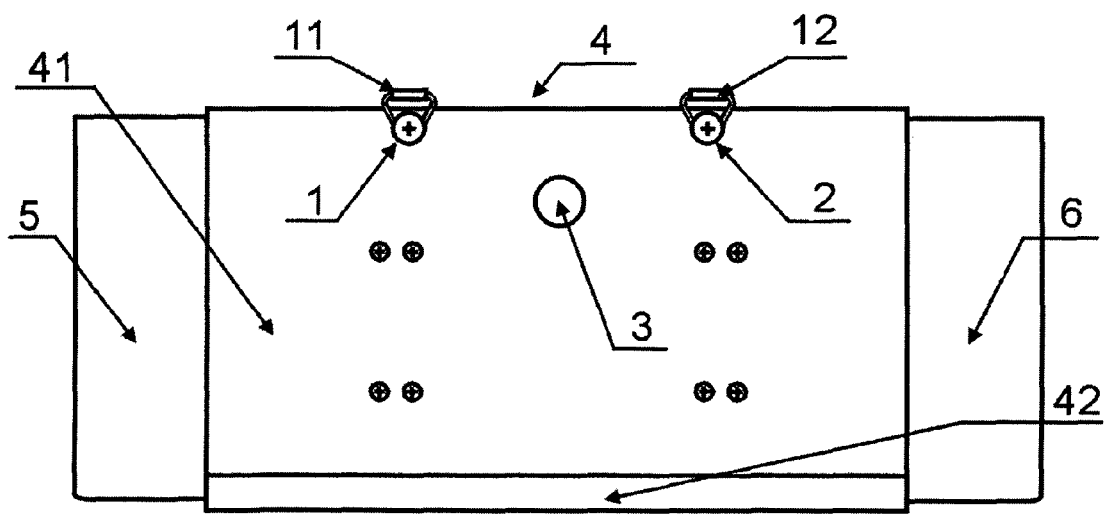
FIG. 15 is a top view of the display light shield according to the above third preferred embodiment of the present invention.
Figure 16:
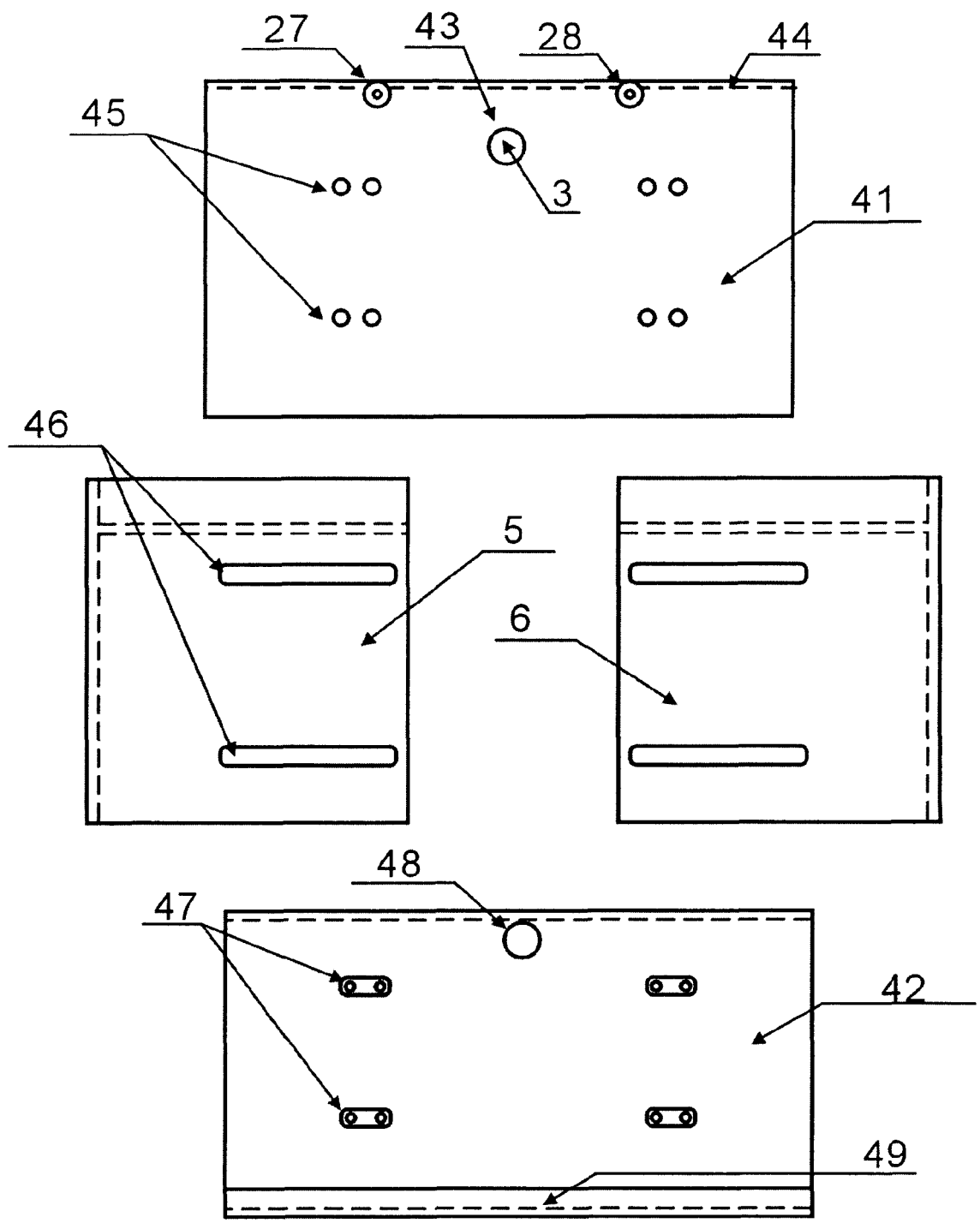
FIG. 16 is an exploded top view of the main element of the display light shield according to the above third preferred embodiment of the present invention.

FIG. 14 is the front view of hood body according to the third embodiment. FIG. 15 is the top view of the hood body according to the third embodiment. As illustrated, the fastening elements 11, 12 are coupled with the fasteners 1, 2 which are two screw bolts. The main element 4 comprises an upper panel 41 and a lower panel 42 overlapping underneath the upper panel 41. The left and right supplemental elements 5, 6 are coupled with two sides of the main element 4 respectively. As illustrated in FIG. 16, the upper layer 41 comprises a connection opening 43 and a cover 3. Each of the left supplemental element 5 and the right supplemental element 6 comprises a positioning member perpendicularly protruding through out the inner surface of the supplemental elements including the top engaging members.

FIG. 16 is the top exploded view of the hood body of the third embodiment. The upper panel 41 is overlapped with the lower panel 42 to form the main element 4. The upper panel 41 has two spaced apart screw holes 27, 28, and a connection opening 43 with the cover 3. The upper panel 41 also comprises a plurality of through holes 45 as the screw holes on the left portion which position is alignedly related to the through hole 47 on the lower panel 42. Symmetrically, the upper panel 41 also comprises another set of through hole on the right portion. The left top engaging member 7 of the left supplemental element 5 comprises an elongated positioning slot 46 longitudinally extending. Respectively, the right top engaging member 8 of the right supplemental element 6 comprises another elongated positioning slot 46 longitudinally extending. The lower panel 42 of the main element 4 also comprises a connection hole 48 with the position alignedly corresponding to the connection hole 43 on the upper panel 41. As illustrated in FIG. 16, the dotted line indicates the position of the upper panel 41, lower panel 42, and the sliding member, sliding slot and positioning member of the left and right top engaging members of the left and right supplemental elements 5, 6 projected on the top surface.

Figure 17:
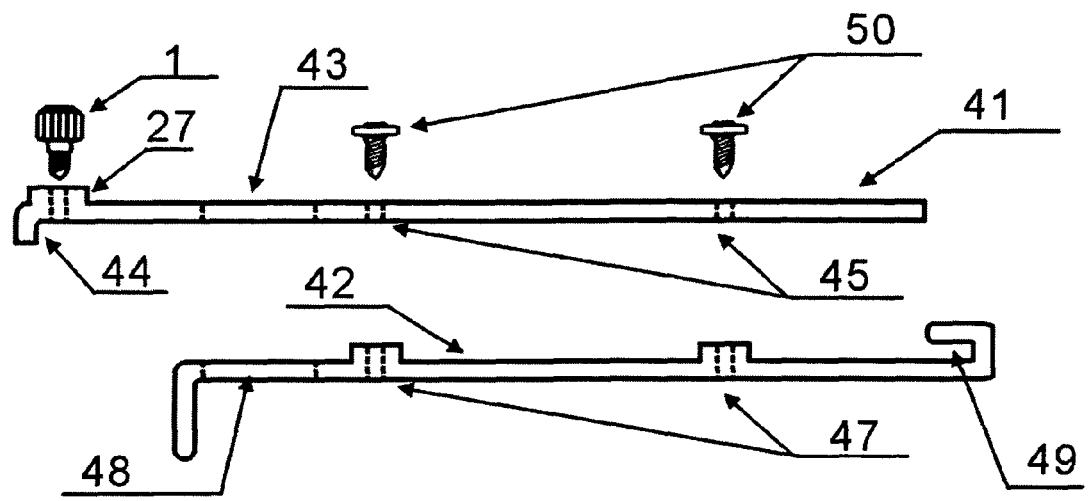
FIG. 17 is an exploded left view of the main element of the display light shield according to the above third preferred embodiment of the present invention.

FIG. 17 is a left exploded view of the main element 4 according to the third embodiment. One end of the upper panel 41 is slidably engaged with the sliding slot 49 of the lower panel 42. A fastener 50, such as screw, extends through the through hole 45 of the upper panel 41, the positioning slot 46 of the left supplemental element 5 consequently, and coupled with the through hole 47 of the lower panel 42. In other words, the left top engaging member 7 is slidably sandwiched between the upper and lower panels 41, 42. In this way, the upper panel 41, the left top engaging member of the left supplemental element 5, and the lower panel 42 are adjustably affixed together in a slidably movable manner according to the position of the positioning slot 46.

Alternatively, in the third embodiment, the screw hole of the lower panel 42 can be changed to a bolt. This bolt extends through the positioning slot of the top engaging member and screw hole of the upper panel consequently, and is coupled with a nut over the upper panel. By fastening the nut, the main element 4 is adjustably affixed with the left and right supplemental elements 5, 6 in a slidably movable manner according to the position of the positioning slot 46.

Alternatively, the main element has one layer, and comprises a longitudinal positioning slot. The top engaging member comprises a screw hole. Or, the top engaging member of the supplemental element comprises a longitudinal positioning slot, the main element comprises a screw hole. A screw extends through the positioning slot and couples with the screw hole to adjustably affixed the main element with the supplemental element together in a slidably movable manner according to the position of the positioning slot.

Figure 18:
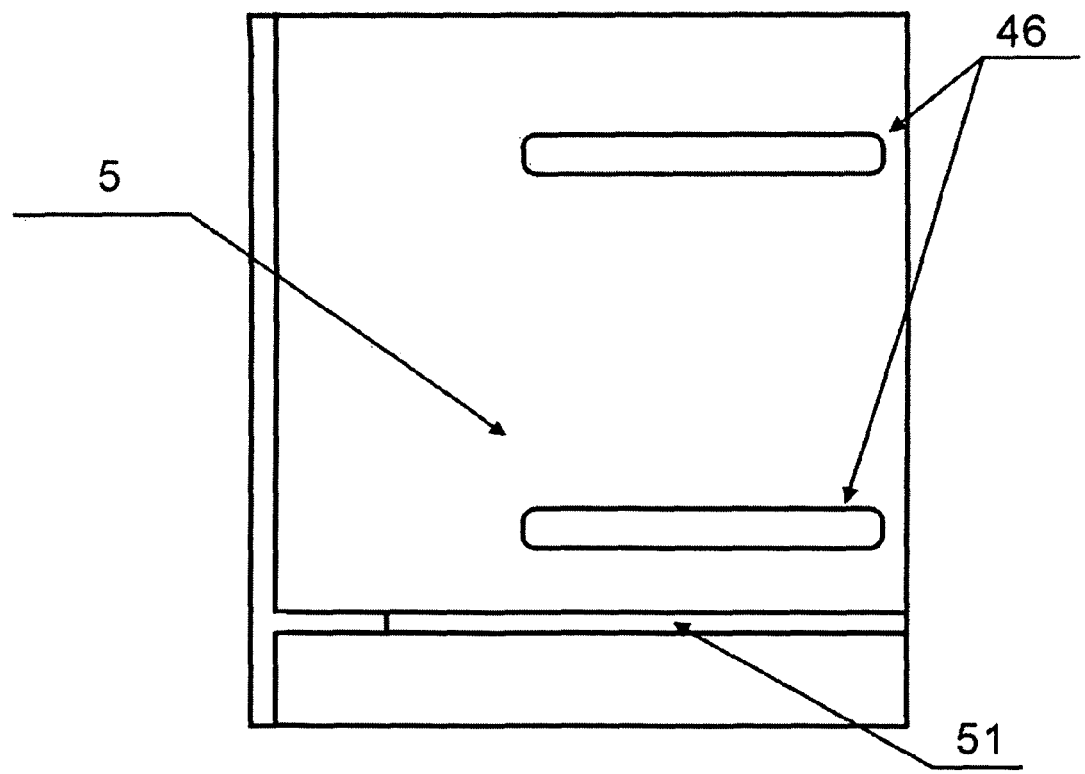
FIG. 18 is a top view of the top engaging member of the left supplemental element of the display light shield according to the above third preferred embodiment of the present invention.

FIG. 18 is a top view of the left supplemental element according to the third embodiment. The left top engaging member 7 of the left supplemental element 5 comprises a positioning slot 46. The left top engaging member 7 also has an elongated protruding member 51 perpendicularly protruding from the inner surface thereof as a positioning guide. One side of the protruding member 51 is retained at the top peripheral edge of the display to prevent it from sliding. The protruding strip member 51 also supports the left top engaging member 7 of the left supplemental element 5.

Figure 19:
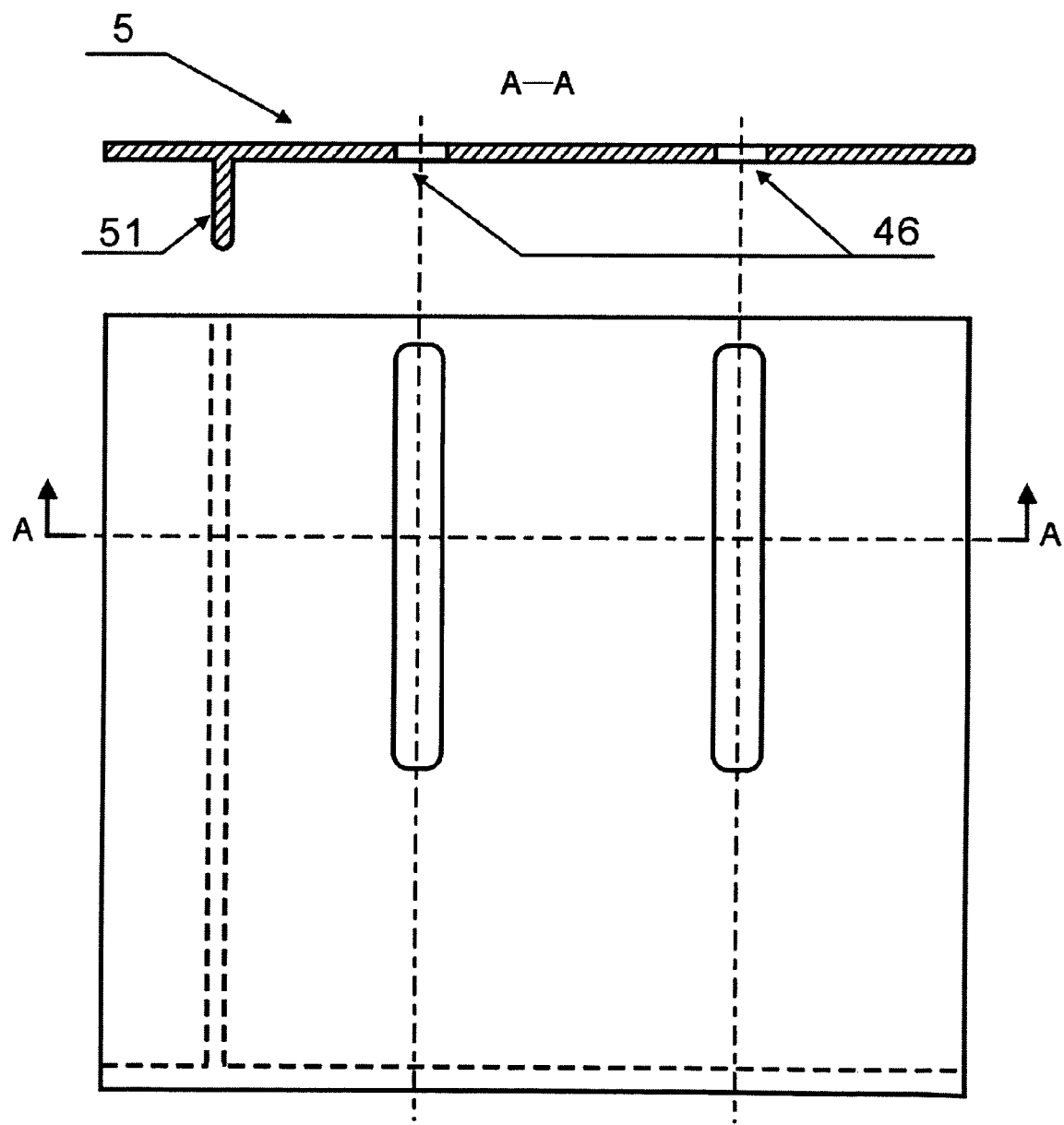
FIG. 19 is a sectional view of the top engaging member of the left supplemental element of the display light shield according to the above third preferred embodiment of the present invention.

FIG. 19 is a sectional view from the A-A section of the left supplemental element 5 according to the third embodiment. The left supplemental element 5 comprises a positioning slot 46, and an elongated protruding member 51 perpendicularly protruding from the inner surface thereof.

Figure 20:
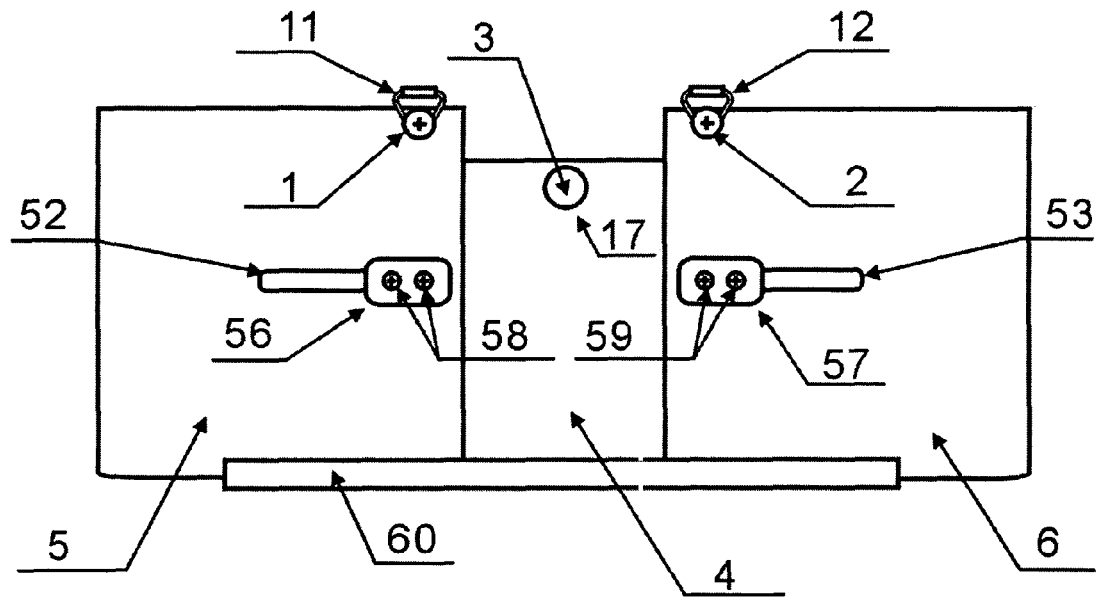
FIG. 20 is a top view of the display light shield according to a fourth preferred embodiment of the present invention.

FIG. 20 is a top view of the hood body according to the fourth embodiment. Each of the left and right supplemental elements 5, 6 comprise a positioning slot 52, 53, and a fastening block 56, 57 respectively. The main element 4 comprises a connection opening 17 and its cover 3. Two fastening elements 11, 12 are coupled with the fasteners 1, 2 respectively which are two screw bolts.

Figure 21:
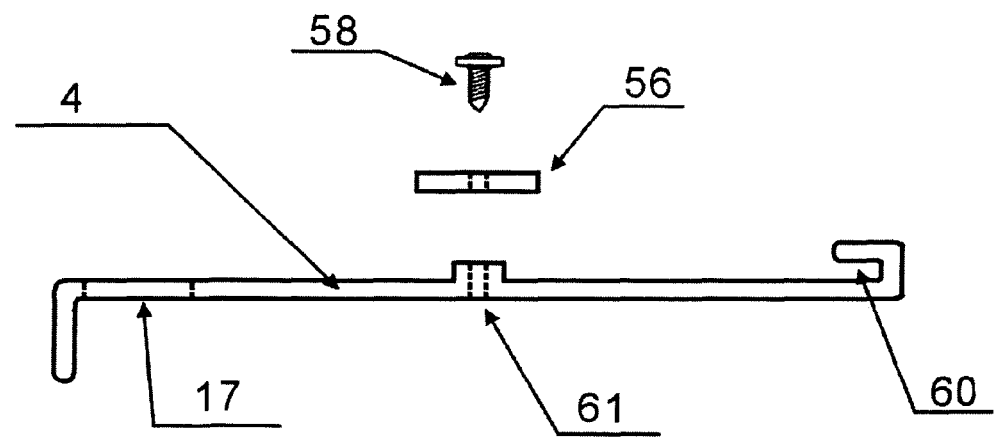
FIG. 21 is an exploded left view of the main element of the display light shield according to the above fourth preferred embodiment of the present invention.

FIG. 21 is the left view of the main element 4 according to the fourth embodiment. The main element 4 comprises a fastening bolt 58, a fastening block 56, a connection opening 17 for USB connection, a screw hole 61, and a sliding slot 60. The screw bolt 58 extends through the fastening block 56, and positioning slot 52 consequently, and couples with the screw hole 61 on the main element 4 to affix the left supplemental elements 5 onto the main 4. The left supplemental elements 5 can be slidably coupled at the main element 4 through different positions in responsive to the positioning slot 52 for positioning adjustment.

Figure 22:
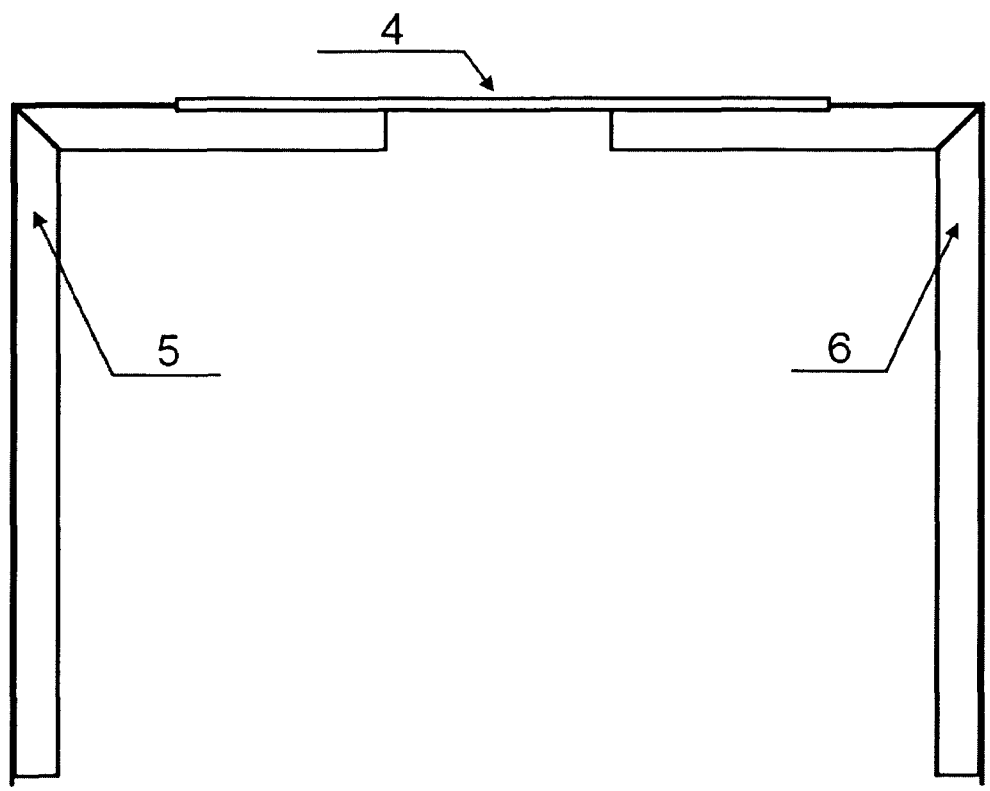
FIG. 22 is a front view of the display light shield according to a fifth preferred embodiment of the present invention.

FIG. 22 is a front view of the hood body according to the fifth embodiment. The shield comprises a main element 4, a left supplemental element 5 extended at a left side of the main element 4, and a right supplemental element 6 extended at a right side of the main element 4.

Figure 23:
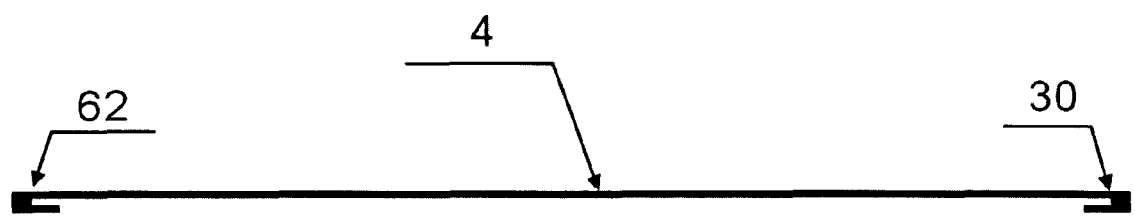
FIG. 23 is a left view of the main element of the display light shield according to the above fifth preferred embodiment of the present invention.

FIG. 23 is a left view of the main element 4 according to the fifth embodiment. The main element 4 comprises two sliding slots 62, 30 provided on front and rear edge of the main element 4 respectively. The top engaging members of the left and right supplemental elements 5, 6 have the same width as the distance between the two sliding slots 62, 30. Two edges of each of the top engaging members are slidably engaged with the two sliding slots 62, 30 respectively for detachably affixing the left and right supplemental elements 5, 6 at the main element 4 firmly. The distance between the left and right supplemental elements 5, 6 is adjustable according to the size of the display by sliding the left and right supplemental elements 5, 6 at the main element 4.

Figure 24:
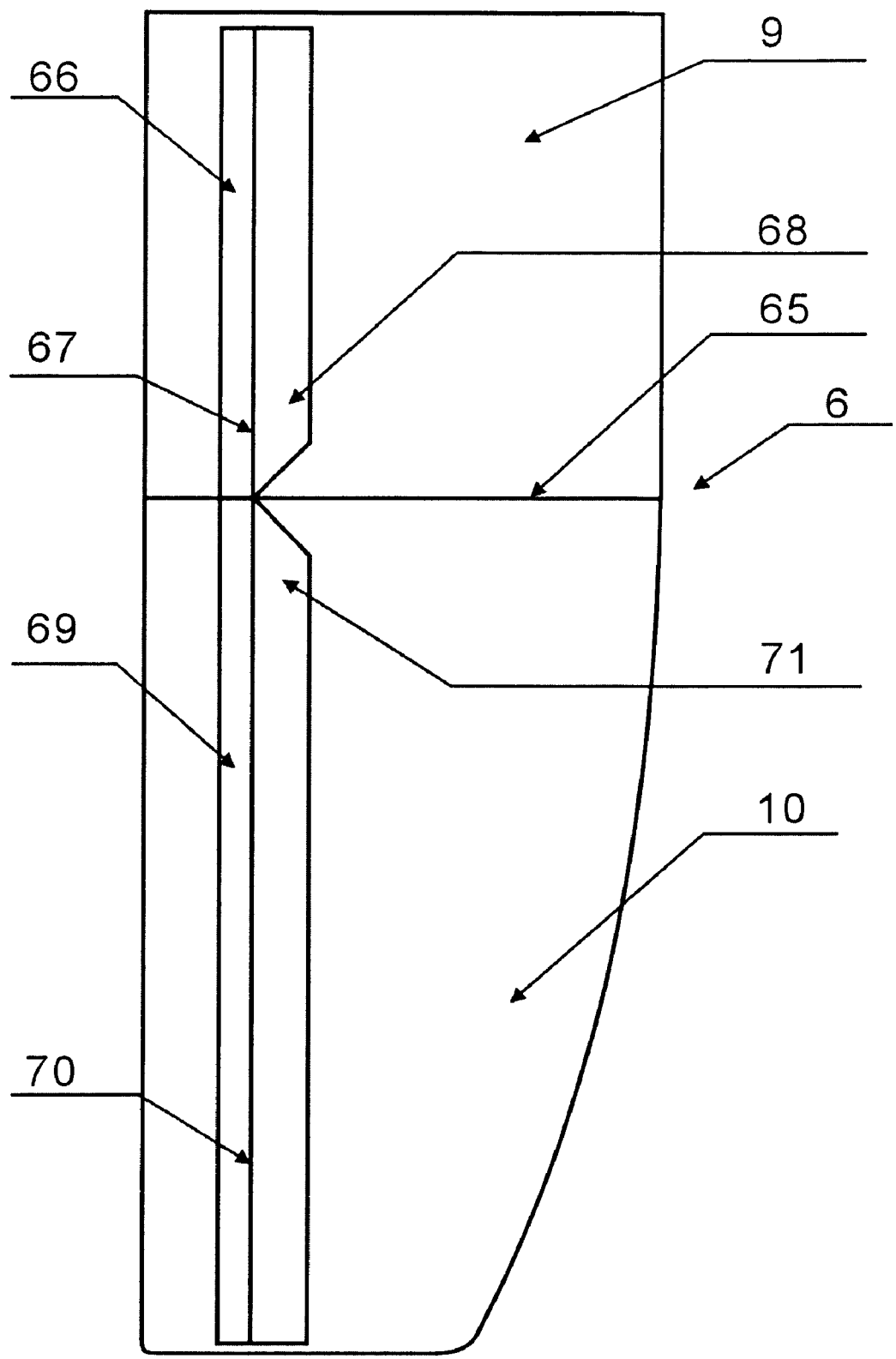
FIG. 24 is a left view of the right supplemental element of the display light shield according to the above fifth preferred embodiment of the present invention, illustrating the right supplemental element at its extending opened position.
Figure 26:
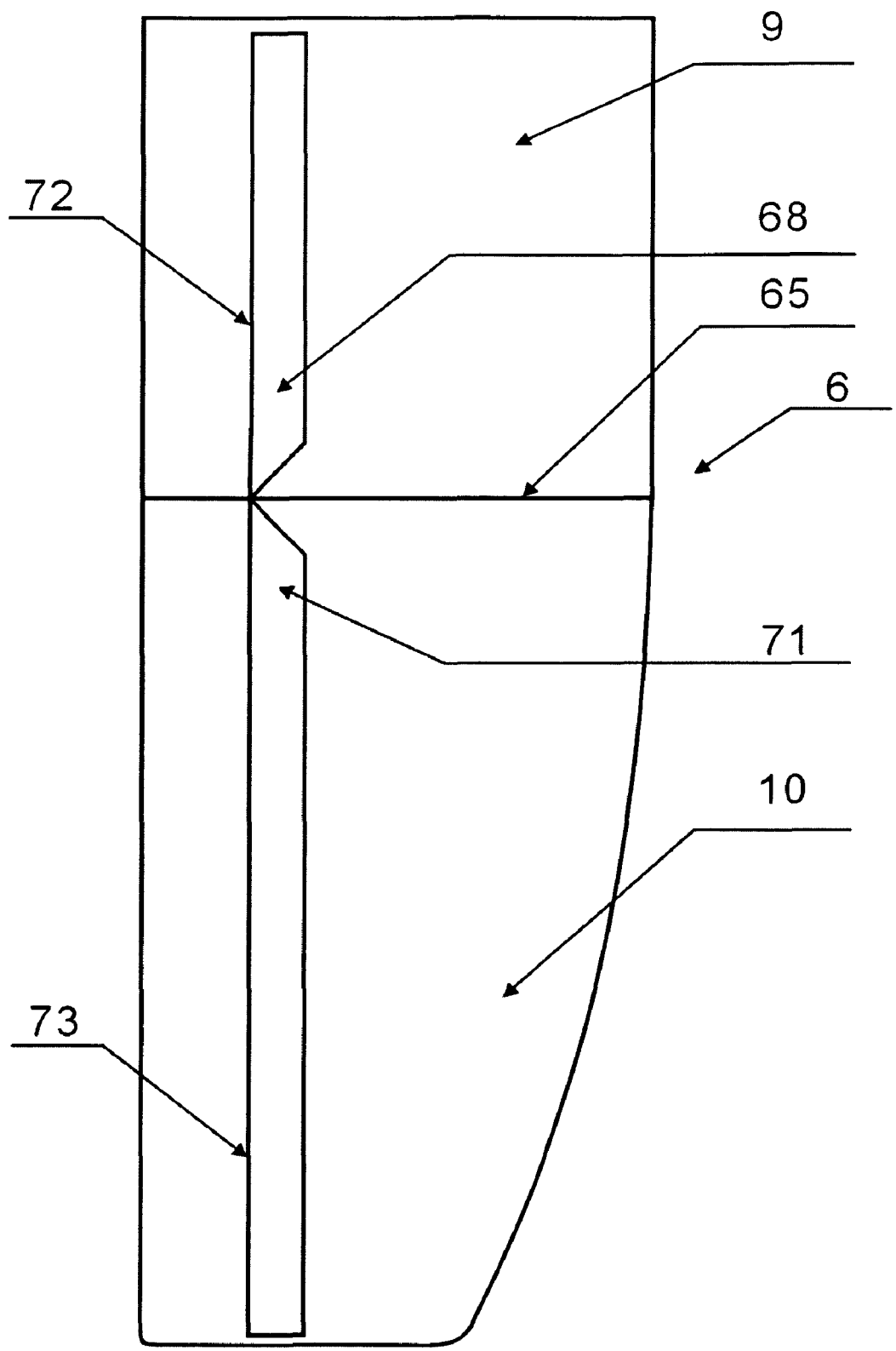
FIG. 26 is a left view of the right supplemental element of the display light shield according to a sixth preferred embodiment of the present invention, illustrating the right supplemental element at its extending opened position.

FIG. 24 is the right view of the right supplemental element 6 at the extended-unfolding position according to the fifth embodiment. FIG. 26 is the right view of the right supplemental element 6 at the extended-unfolding position according to the sixth embodiment. As illustrated, the right supplemental element 6 comprises a right top engaging member 9 and a right side shielding member 10. The top engaging member 9 and the right side shielding member 10 are extended in one piece structure and can be folded along a folding groove 65. The top engaging member 9 comprises an elongated top positioning member 66 longitudinally extended on the inner surface thereof for holding at the top peripheral edge of the display. A longitudinal portion of the top positioning member 66 is attached on the inner side of the top engaging member 9, wherein the other longitudinal portion of the top positioning member 66 forms a side protruding member 68 adapted to fold away from the inner side of the top engaging member 9 along a top folding line 67 and to fold to overlap on the inner side of the top engaging member 9. In other words, the two longitudinal portions of the top positioning member 66 are divided along the top folding line 67. The right side shielding member 10 of the right supplemental element 6 also comprises a side positioning member 69 longitudinally extended on the inner surface thereof for holding at the side peripheral edge of the display. A longitudinal portion of the side positioning member 69 is attached on the inner side of the right side shielding member 10, wherein the other longitudinal portion of the side positioning member 69 forms a side protruding member 71 adapted to fold away from the inner side of the right side shielding member 10 along a side folding line 70 and to fold to overlap on the inner side of the right side shielding member 10. In other words, the two longitudinal portions of the side positioning member 69 are divided along the side folding line 70. Both of the top and side protruding members 68, 71 have an inclined edge with 45 degree to the folding groove 65 at the junction thereof. The positioning members 66, 69 can be attached to the surface of the right supplemental element 6 by glue or double-sided tape.

The right supplemental element 6 mentioned above is an integrated piece. The right top engaging member 9 and the right side shielding member 10 can be folded along the folding groove 65 such that the right top engaging member 9 and the right side shielding member 10 can be folded in a planar manner. Having the foldable positioning members 66, 69 on the right top engaging member 9 and the right side shielding member 10 respectively, the positioning members 66, 69 can be folded flat on the right top engaging member 9 and the right side shielding member 10. Therefore, the right supplemental element 6 can be folded flat to save the space for shipping and handling. It is worth to mention that the left supplemental element 5 has the same structural configuration of the right supplemental element 6 such that the left supplemental element 5 can also be folded flat as the right supplemental element 6.

Figure 25:
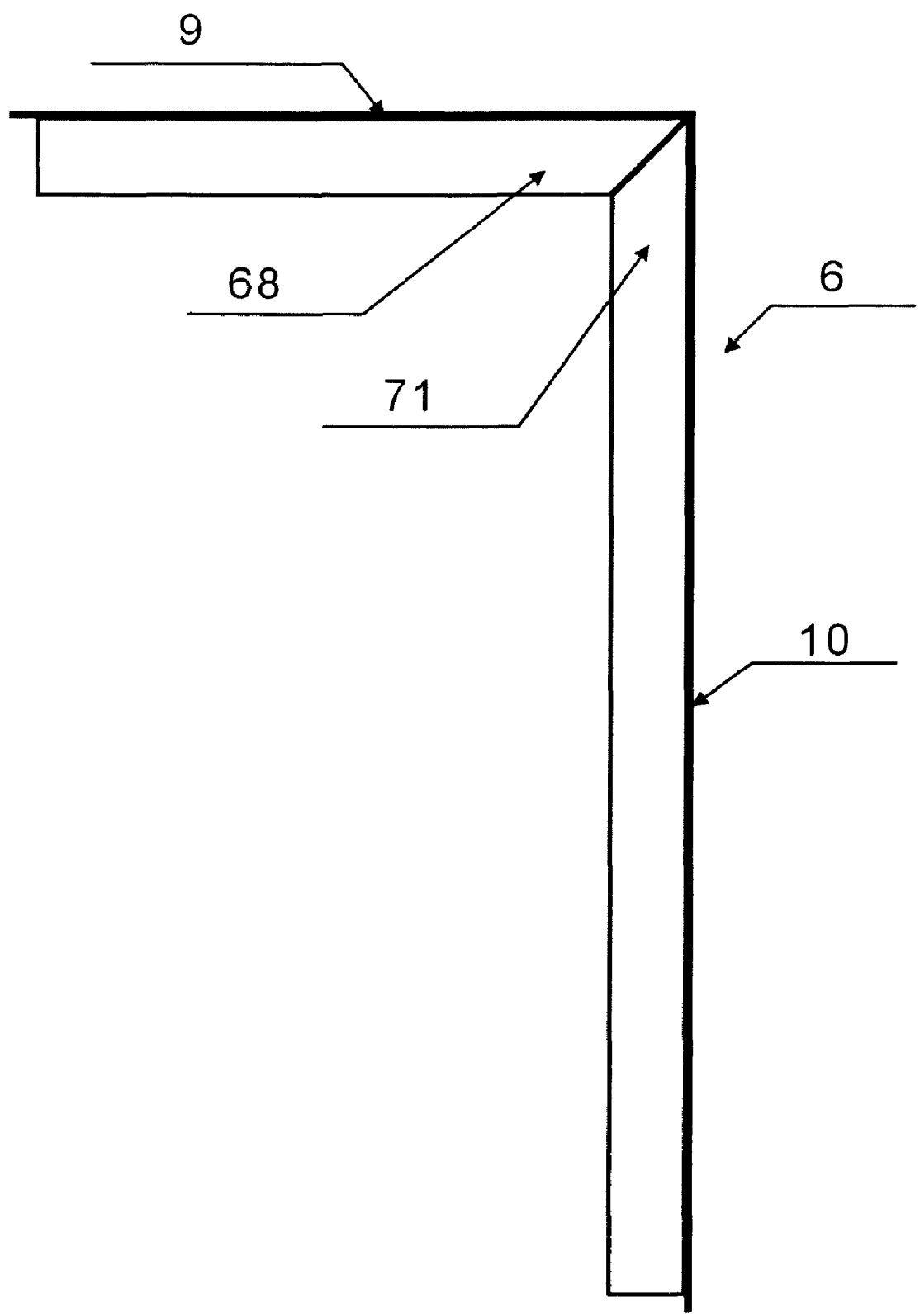
FIG. 25 is a front view of the right supplemental element of the display light shield according to the above fifth preferred embodiment of the present invention, illustrating the right supplemental element at its folded position.

As illustrated in FIG. 25, during application, the right top engaging member 9 and the right side shielding member 10 can be folded in right angle that the right top engaging member 9 is perpendicular to the right side shielding member 10. When the protruding members 68, 71 are unfolded, the two inclined edges are attached to each other.

FIG. 26 is a right view of the right supplemental element 6 at the extended-unfolding position according to the sixth embodiment. In the sixth embodiment, the protruding members 68, 71 are integrally formed with the right supplemental element 6 to form a one piece integrated structure. The top protruding member 68 is integrally formed on the inner surface of the right top engaging member 9, wherein the side protruding member 71 is integrally formed on the inner surface of the right side shielding member 10. The top protruding member 68 can be folded along the top folding groove 72, wherein the top folding groove 72 is formed along the conjunction between the right top engaging member 9 and the top protruding member 68 such that the top protruding member 68 can be folded flat on the right top engaging member 9 or folded perpendicular to the right top engaging member 9. Likewise, the side protruding member 71 can be folded along the side folding groove 73 wherein the side folding groove 73 is formed along the conjunction between the right side shielding member 10 and the side protruding member 71 such that the side protruding member 71 can be folded flat on the right side shielding member 10 or folded perpendicular to the right side shielding member 10. Both of the two protruding members 68, 71 have an inclined edge with 45 degree to the folding groove 65 at the junction thereof. The right top engaging member 9 and the right side shielding member 10 can be folded along the folding groove 65.

Figure 27:
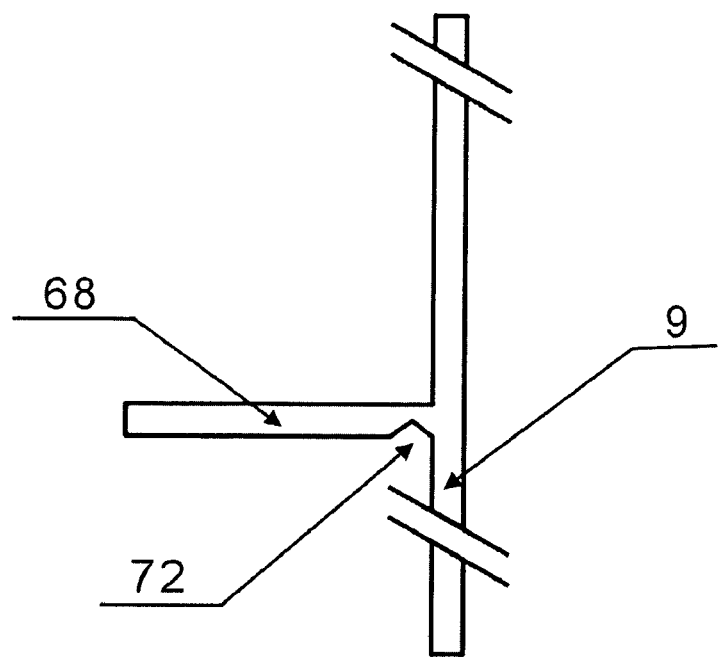
FIG. 27 is a top view of the right supplemental element of the display light shield according to the above sixth preferred embodiment of the present invention, illustrating the right supplemental element at its extending opened position at the ridge.

FIG. 27 is the bottom view of the right supplemental element 6 according to the sixth embodiment illustrating the folded protruding member of the right top engaging member 9. The protruding member 68 is folded perpendicularly to the right top engaging member 9 along the top folding groove 72.

Figure 28:
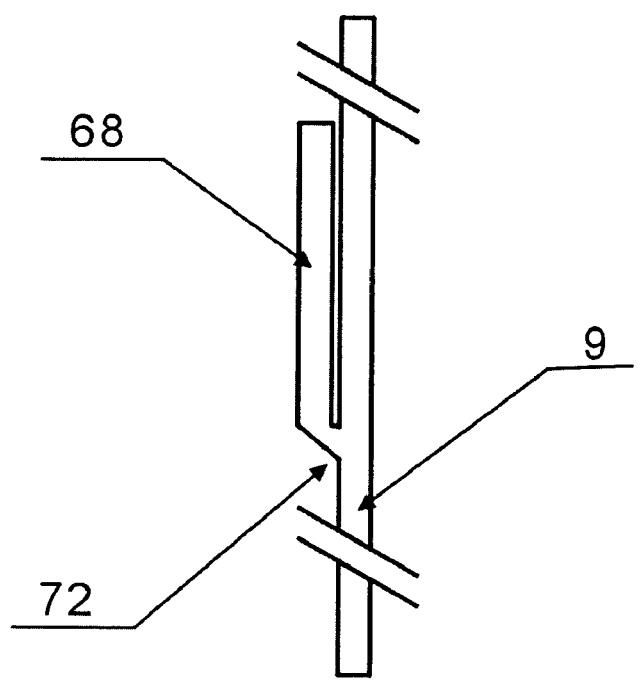
FIG. 28 is a top view of the right supplemental element of the display light shield according to the above sixth preferred embodiment of the present invention, illustrating the right supplemental element at its folded position at the ridge.

FIG. 28 is the bottom view of the right supplemental element 6 according to the sixth embodiment illustrating the folded protruding member of the right top engaging member 9. The top protruding member 68 is folded parallelly to the right top engaging member 9 along the top folding groove 72. In other words, the top protruding member 68 is folded flat on the right top engaging member 9.

The side protruding member 71 and the side folding groove 73 have the same structure as the top protruding member 68 and the top folding groove 72 mentioned above.

In the following description, the direction is according to the front view of the hood body according to the seventh embodiment.

Figure 29:
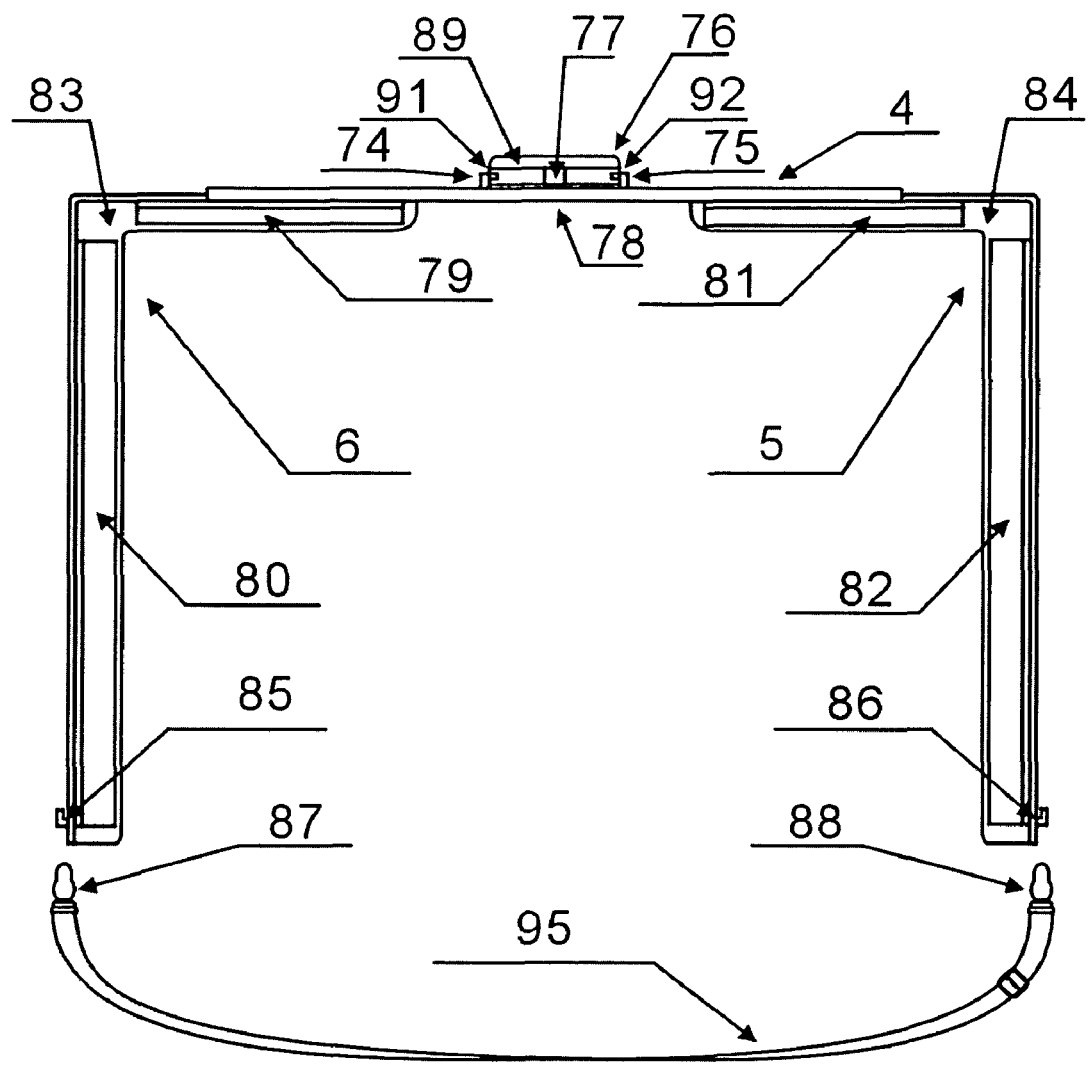
FIG. 29 is a rear view of the display light shield according to a seventh preferred embodiment of the present invention.

FIG. 29 is the rear view of the hood body according to the seventh embodiment. The main element 4 comprises a sliding cover 76 in the center. The right top engaging member 9 of the right supplemental element 6 comprises a top positioning member provided at the inner side thereof for holding at the front side of the periphery of the display. A soft plastic block 79 is provided at the inner side of the right top engaging member 9 of the right supplemental element 6 for contacting with the periphery of the display. The right side shielding member 10 of the right supplemental element 6 comprises a side positioning member provided at the inner side thereof for holding at the front side of the periphery of the display. A soft plastic block 80 is provided at the inner side of the right side shielding member 10 of the right supplemental element 6 for contacting with the periphery of the display. The left top engaging member 7 of the left supplemental element 5 comprises a top positioning member provided at the inner side thereof for holding at the front side of the periphery of the display. A soft plastic block 81 is provided at the inner side of the left top engaging member 7 of the left supplemental element 5 for contacting with the periphery of the display. The left side shielding member 8 of the left supplemental element 5 comprises a side positioning member provided at the inner side thereof for holding at the front side of the periphery of the display. A soft plastic block 82 is provided at the inner side of the left side shielding member 8 of the left supplemental element 5 for contacting with the periphery of the display.

The elastic fastening belt 95 has two button rings 87, 88 at the two ends thereof respectively. During installation, the button ring 87 is coupled with the button 85 on the outer side of the bottom portion of the right side shielding member 10 of the right supplemental element 6. The button ring 88 is coupled with the button 86 on the outer side of the bottom portion of the left side shielding member 9 of the left supplemental element 5.

Figure 30:
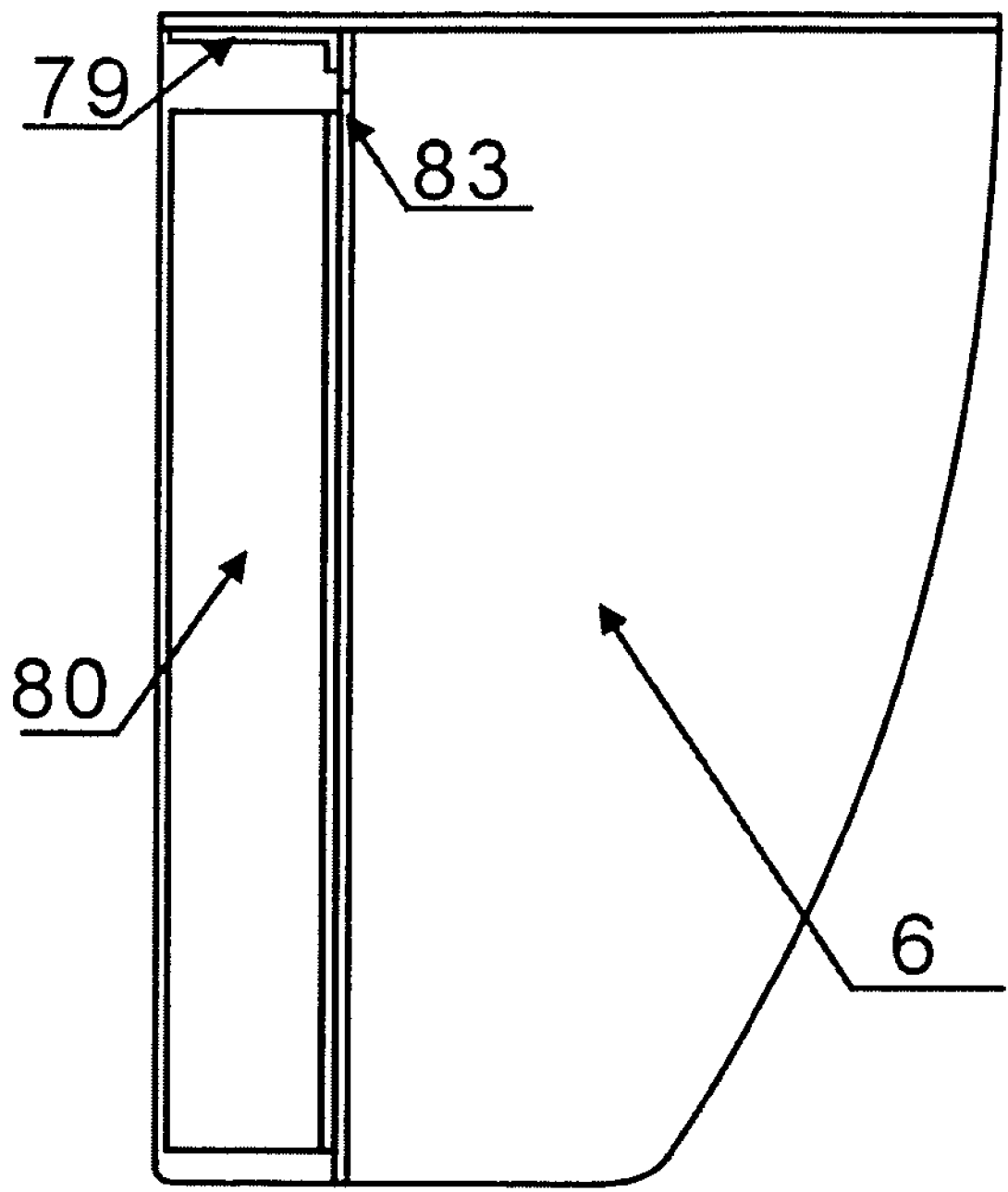
FIG. 30 is a left view of the right supplemental element of the display light shield according to the above seventh preferred embodiment of the present invention.

FIG. 30 is the left view of the right supplemental element 6 according to the seventh embodiment. As illustrated, the right top engaging member 9 of the right supplemental element 6 comprises a soft plastic block 79 attached on the inner surface of the positioning member located at the inner surface of the right top engaging member 9. The right side shielding member 10 of the right supplemental element 6 comprises a soft plastic block 80 attached on the inner surface of the positioning member 83 located at the inner surface of the right side shielding member 10.

Figure 31:
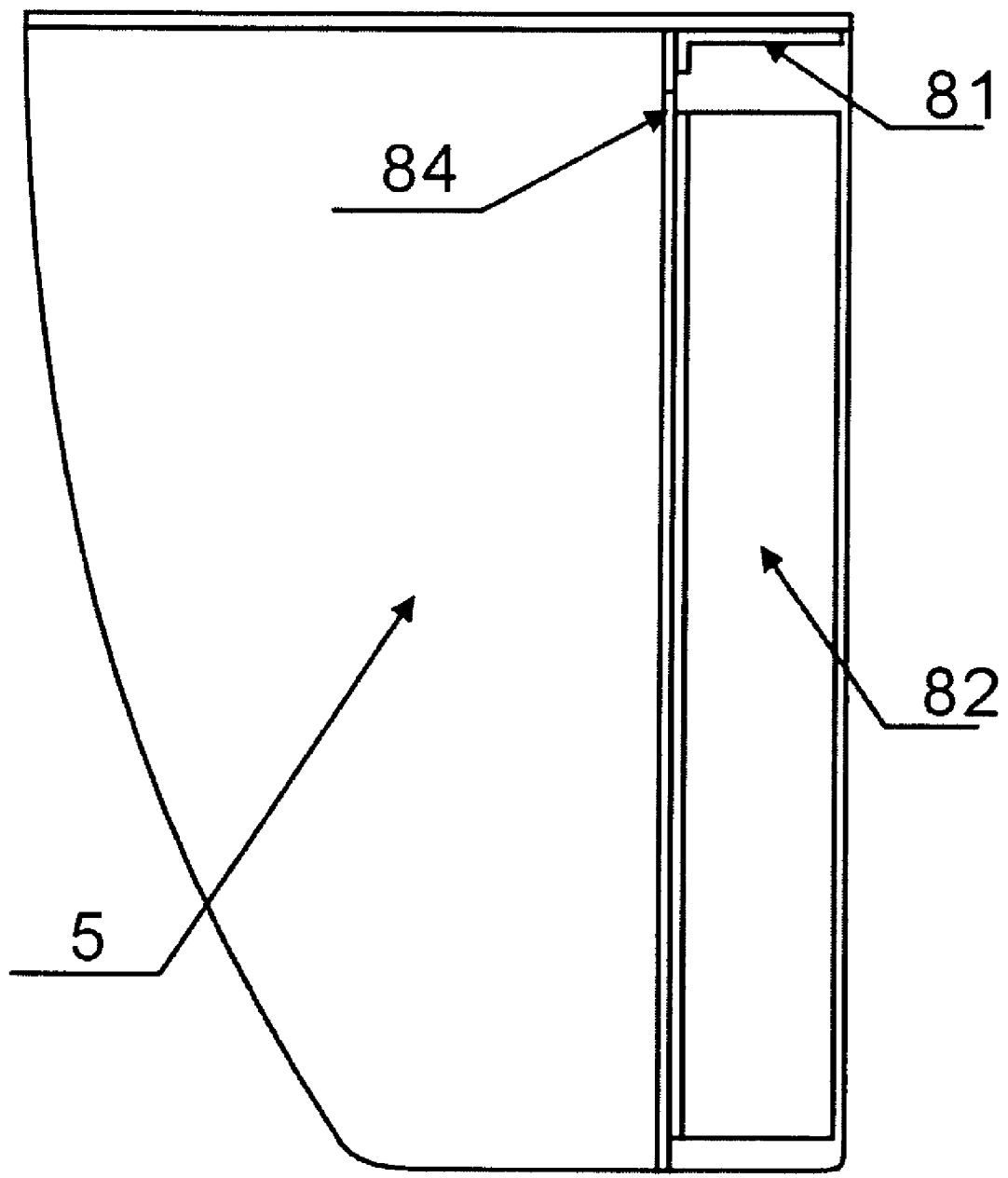
FIG. 31 is a right view of the left supplemental element of the display light shield according to the above seventh preferred embodiment of the present invention.

FIG. 31 is the right view of the left supplemental element 5 according to the seventh embodiment. As illustrated, the left top engaging member 7 of the left supplemental element 5 comprises a soft plastic block 81 attached on the inner surface of the positioning member located at the inner surface of the left top engaging member 7. The left side shielding member 8 of the left supplemental element 5 comprises a soft plastic block 82 attached on the inner surface of the positioning member 84 located at the inner surface of the left side shielding member 8.

Figure 32:
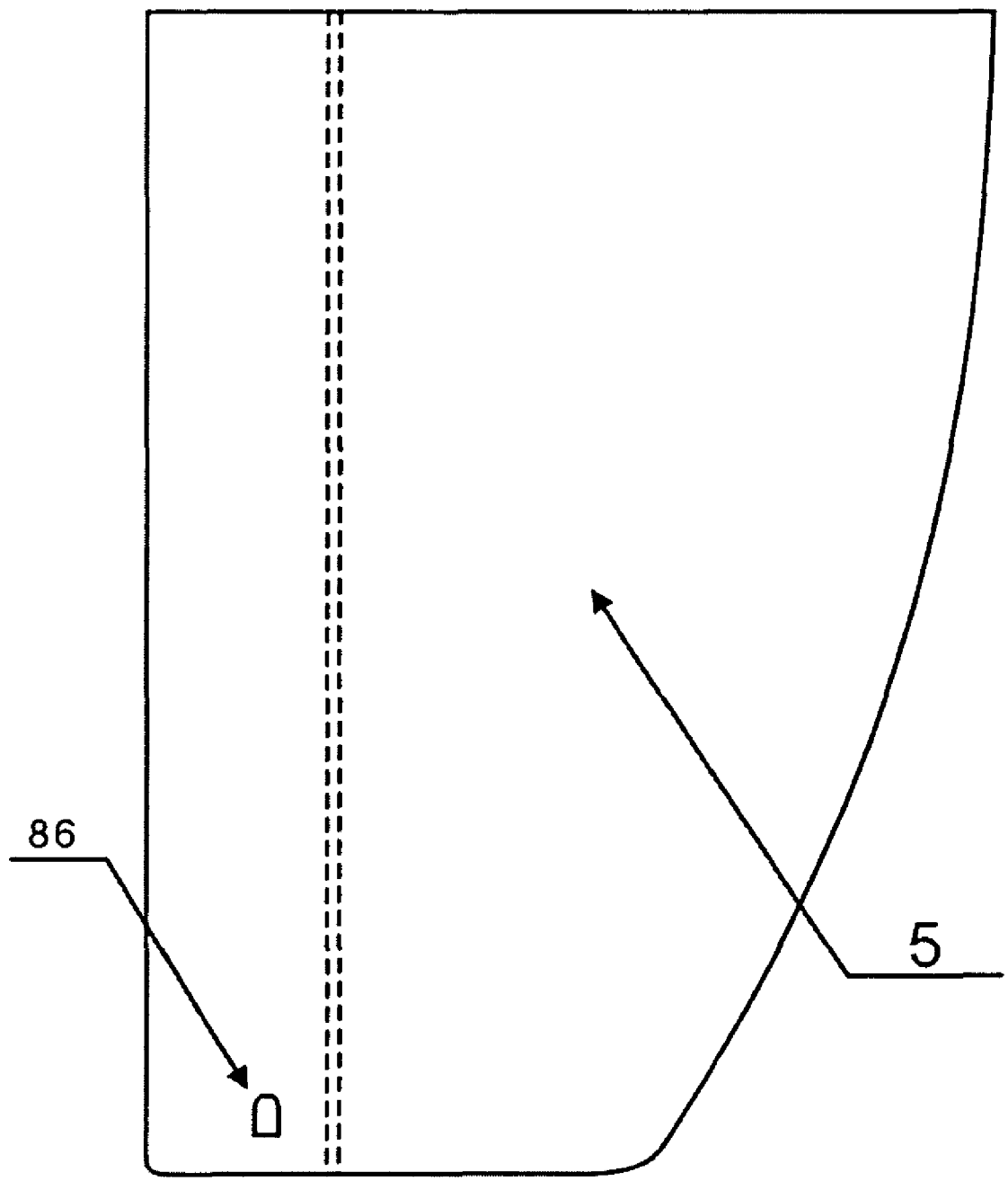
FIG. 32 is a left view of the left supplemental element of the display light shield according to the above seventh preferred embodiment of the present invention.
Figure 33:
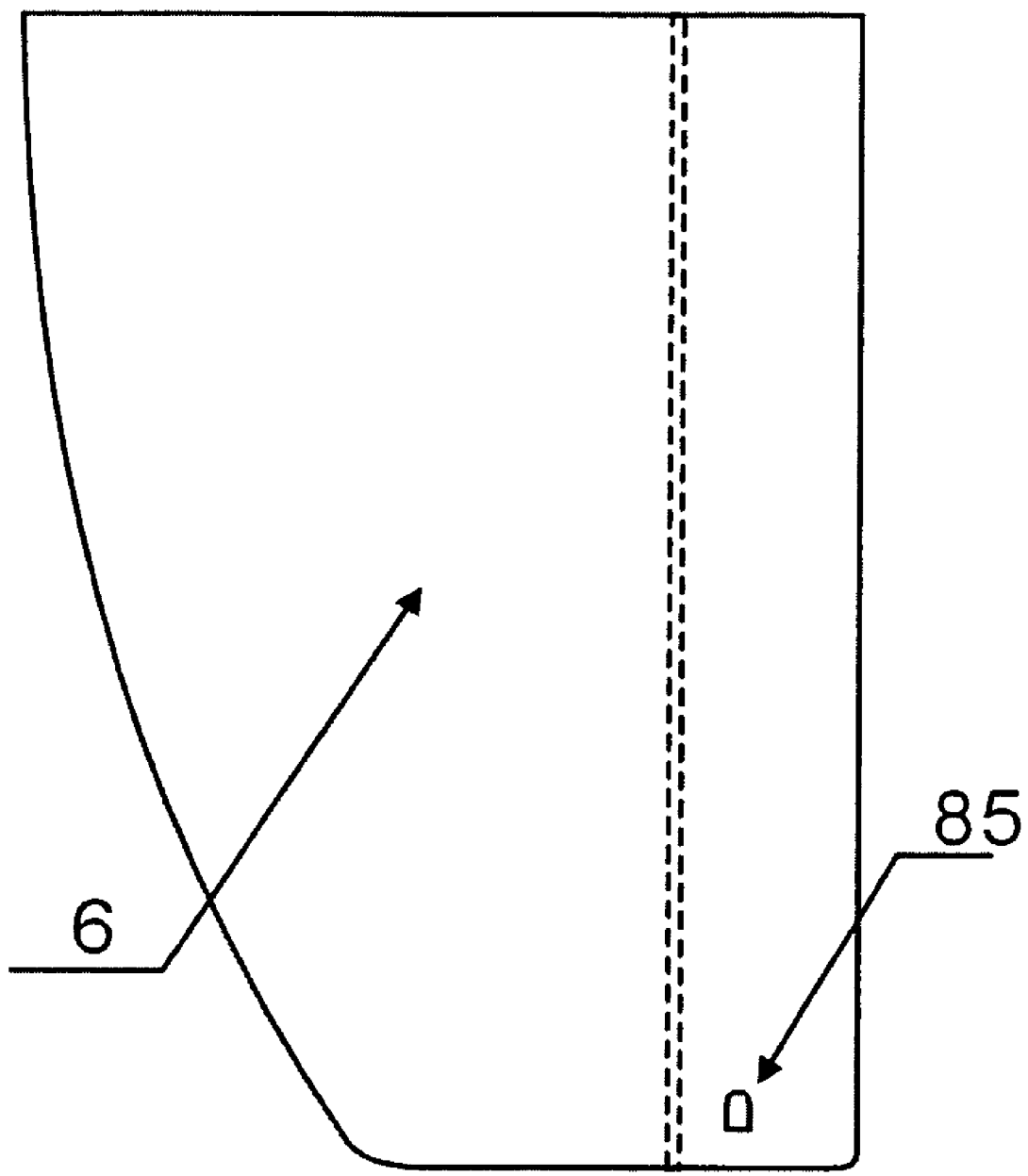
FIG. 33 is a right view of the right supplemental element of the display light shield according to the above seventh preferred embodiment of the present invention.

FIG. 32 is the left view of the left supplemental element 5 according to the seventh embodiment. The left supplemental element 5 comprises a left hanger 86 on the outer side of the bottom portion thereof. FIG. 33 is the right view of the right supplemental element 6 according to the seventh embodiment. The right supplemental element 6 comprises a right hanger 85 on the outer side of the bottom portion thereof.

Figure 34:
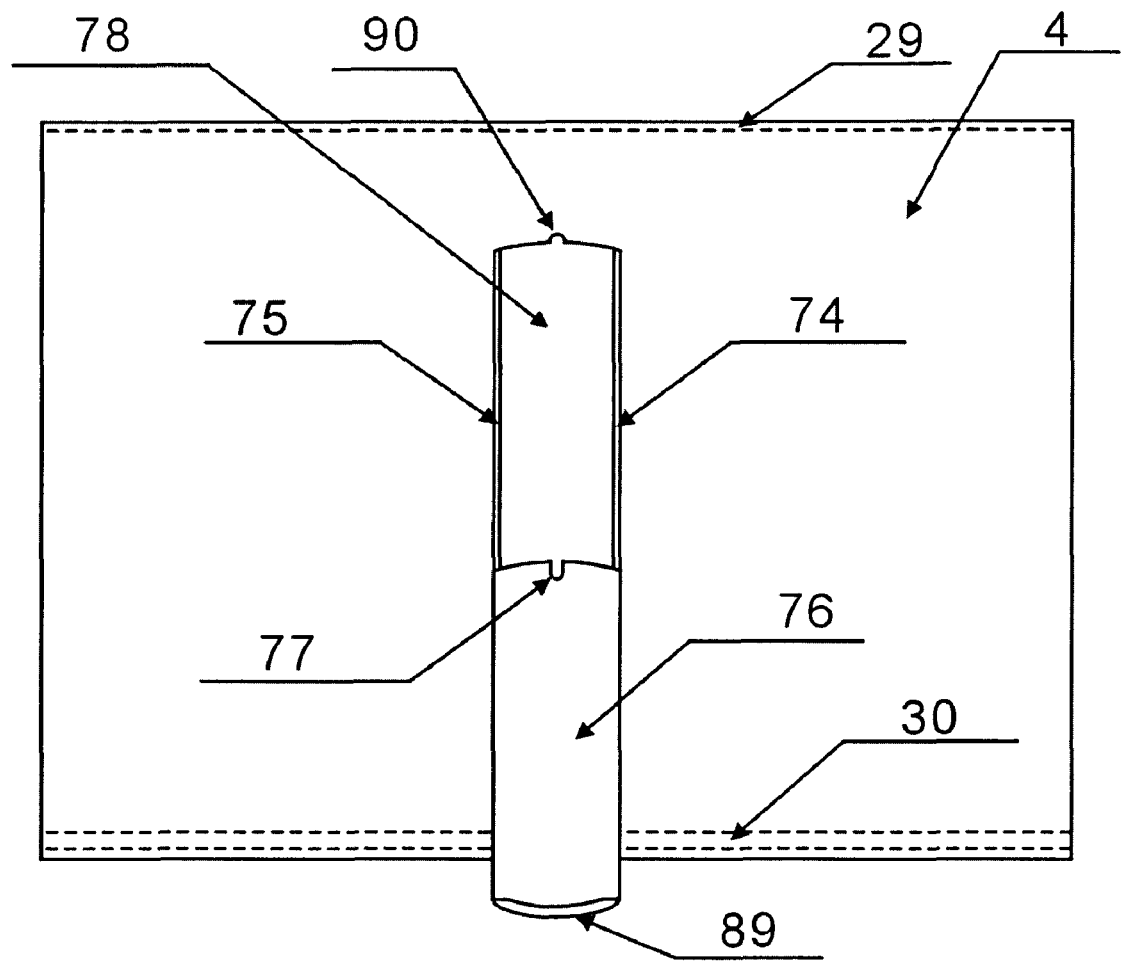
FIG. 34 is a top view of the main element of the display light shield according to the above seventh preferred embodiment of the present invention.

FIG. 34 is the top view of the main element 4 according to the seventh embodiment, wherein the sliding cover 76 is in an opened position. As illustrated, the sliding cover 76 is able to slide along the left sliding track 75 and right sliding track 74 by slidably engaging the two side edges of the sliding cover 76 along the left and right sliding tracks 75, 74 respectively. The connection opening 78 has a first hemisphere gap 90 at the rear portion thereof, and the sliding cover 76 has a corresponding second hemisphere gap 77 at the rear portion thereof to align with the first hemisphere gap 90. The wire for connecting equipments can pass through the connection opening 78 and the sliding cover 76 through the first and second hemisphere gaps 90, 77. The sliding cover 76 comprises a handle 89 at the front portion thereof for user to pull or push the sliding cover 76 to enclose or expose the connection opening 78.

Figure 35:
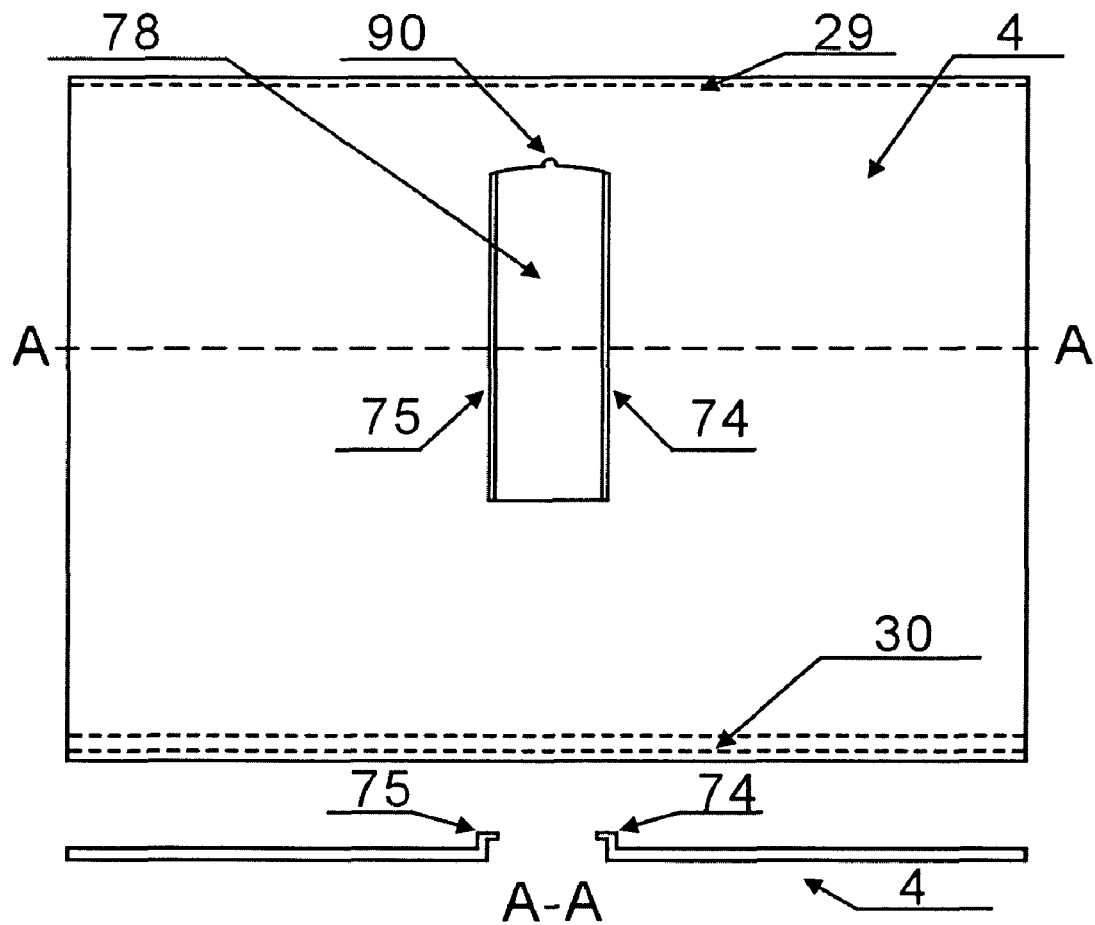
FIG. 35 is an A-A sectional view of the main element of the display light shield according to the above seventh preferred embodiment of the present invention.

FIG. 35 is the sectional view of the main element 4 along the A-A line according to the seventh embodiment. The connection opening 78 has two sliding track 75, 74 at two sides, and a hemisphere gap 90 at rear.

Figure 36:
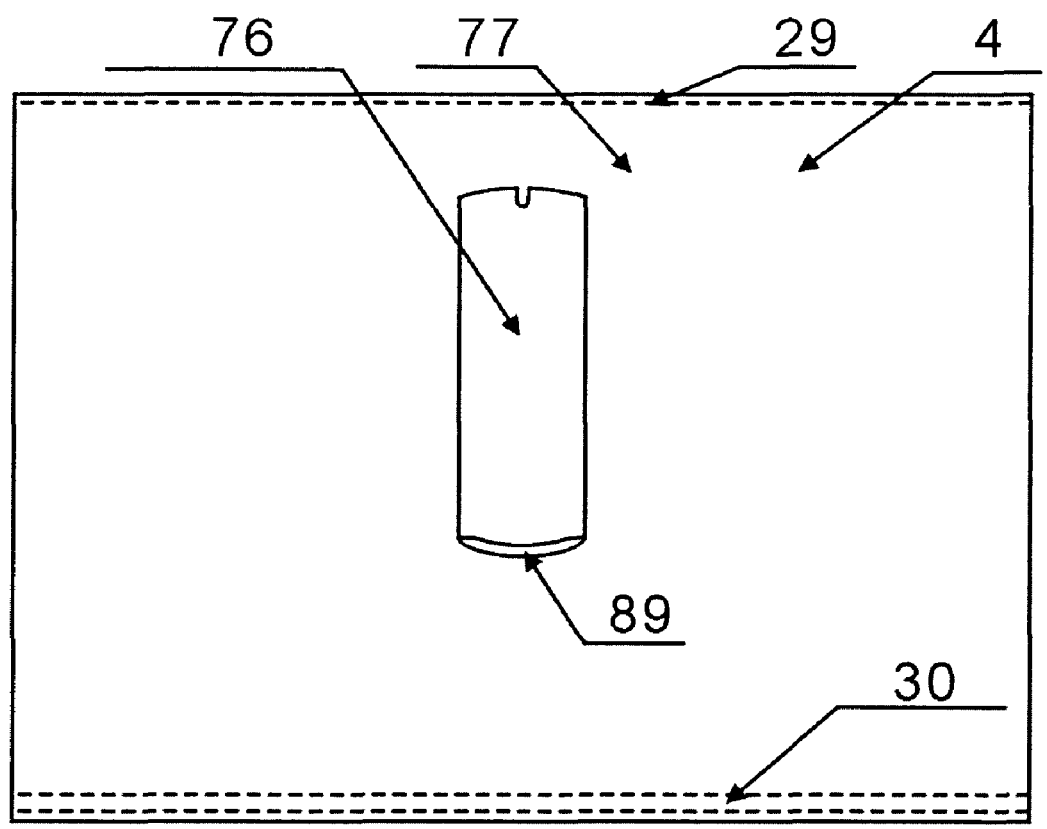
FIG. 36 is a top view of the main element of the display light shield according to the above seventh preferred embodiment of the present invention, illustrating the sliding cover being slid at closed position.

FIG. 36 is the top view of the main element 4 according to the seventh embodiment when the sliding cover 76 is at a closed position to enclose the connection opening 78. As illustrated, the sliding cover 76 has a handle 89 at the front portion thereof. The dotted line indicates the position of the sliding slot 30, and the positioning block 29 projected on the top of the main element 4.

Figure 37:
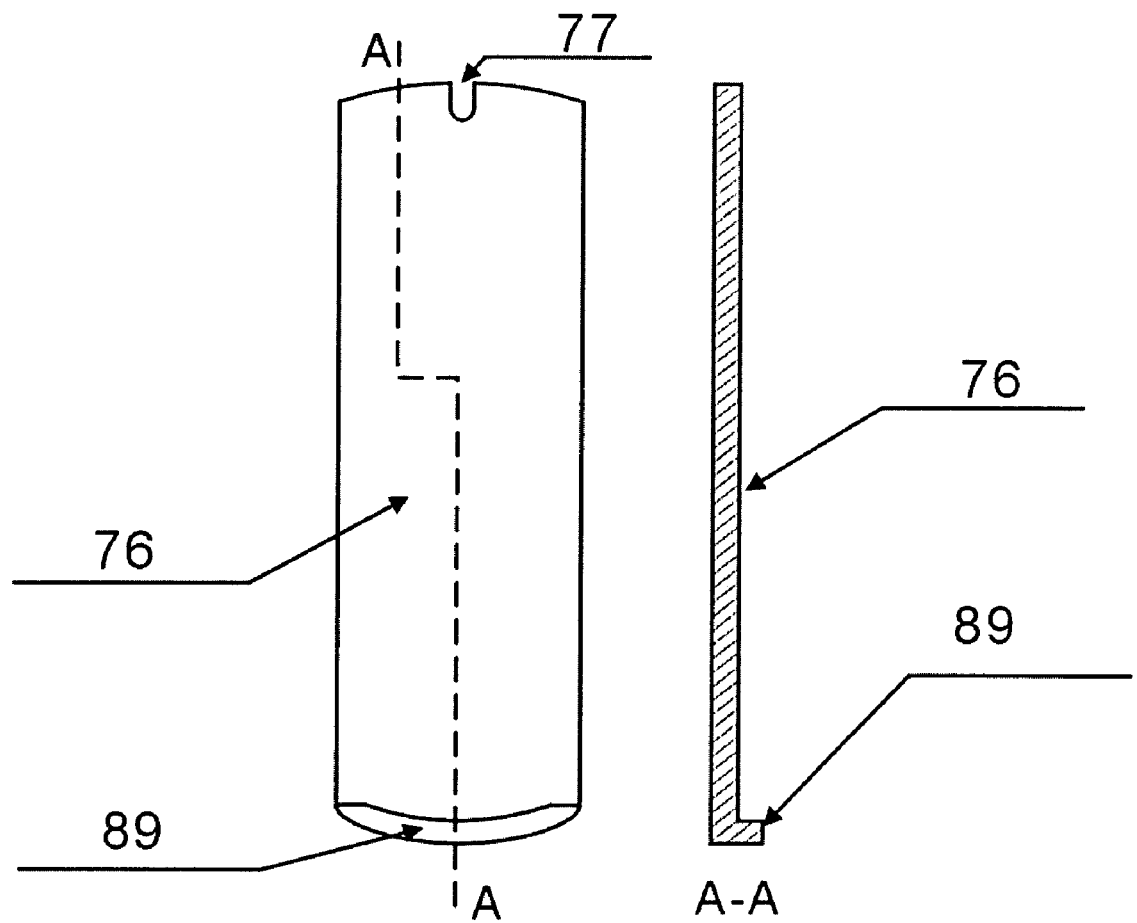
FIG. 37 is an A-A longitudinally sectional view of the sliding cover of the display light shield according to the above seventh preferred embodiment of the present invention.

FIG. 37 is the longitudinal sectional view of the sliding cover 76 along the A-A line according to the seventh embodiment to illustrate the handle 89 being formed at the front portion of the sliding cover 76 and the hemisphere gap 77 being formed at the rear portion of the sliding cover 76.

Figure 38:
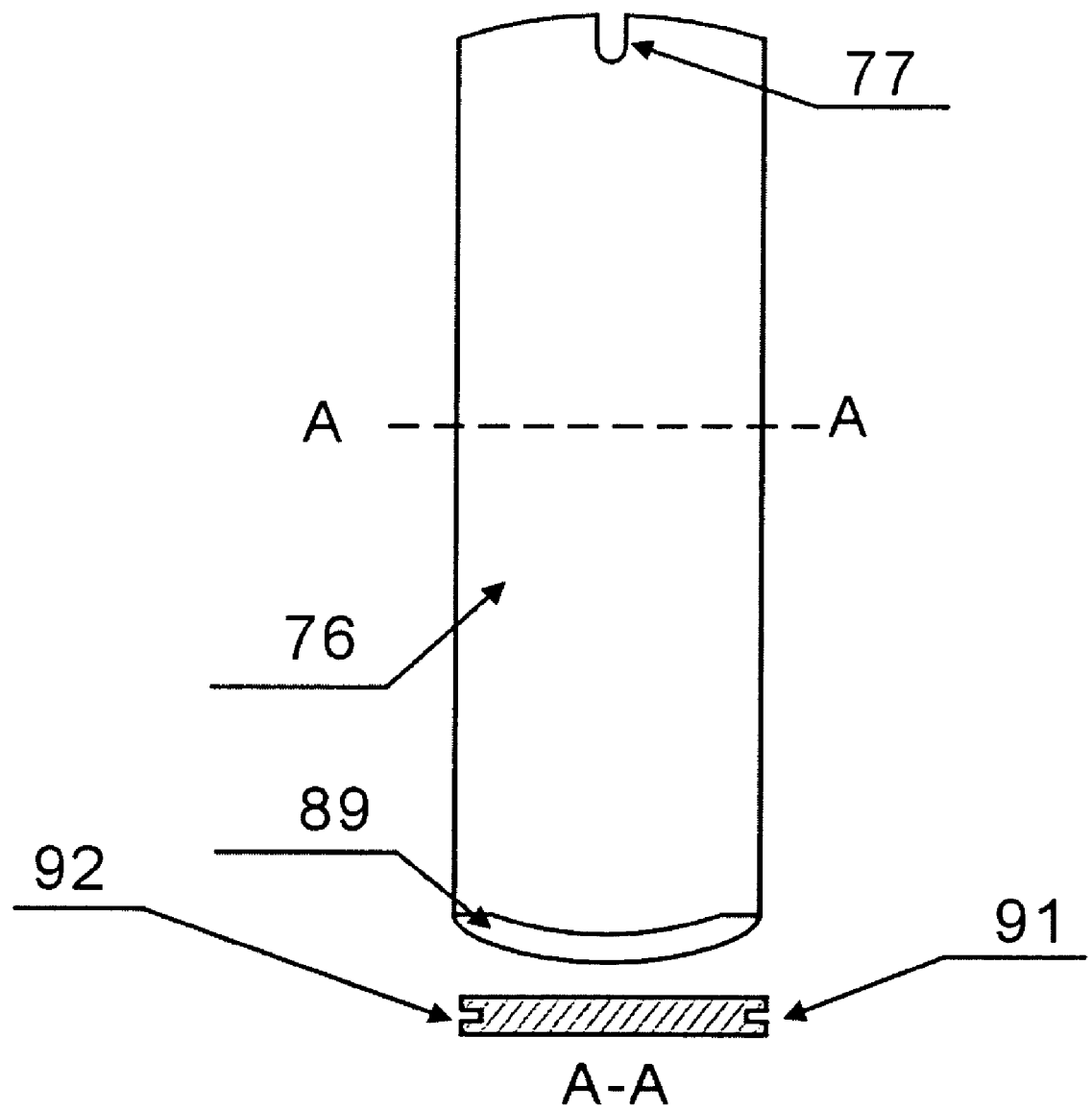
FIG. 38 is an A-A transversely sectional view of the sliding cover of the display light shield according to the above seventh preferred embodiment of the present invention.

FIG. 38 is the transverse sectional view of the sliding cover 76 along the A-A line according to the seventh embodiment, wherein the handle 89 is formed at the front portion of the sliding cover 76 and the hemisphere gap 77 is formed at the rear portion of the sliding cover 76. The two sliding grooves 92, 91 are formed at two side edges of the sliding cover 76 respectively. Accordingly, the two sliding grooves 92, 91 are able to be slidably coupled with the two sliding tracks 75, 74 of the connection opening 78 respectively. The connection opening 78 can be opened and closed by the sliding structure of the sliding cover 76.

Figure 39:
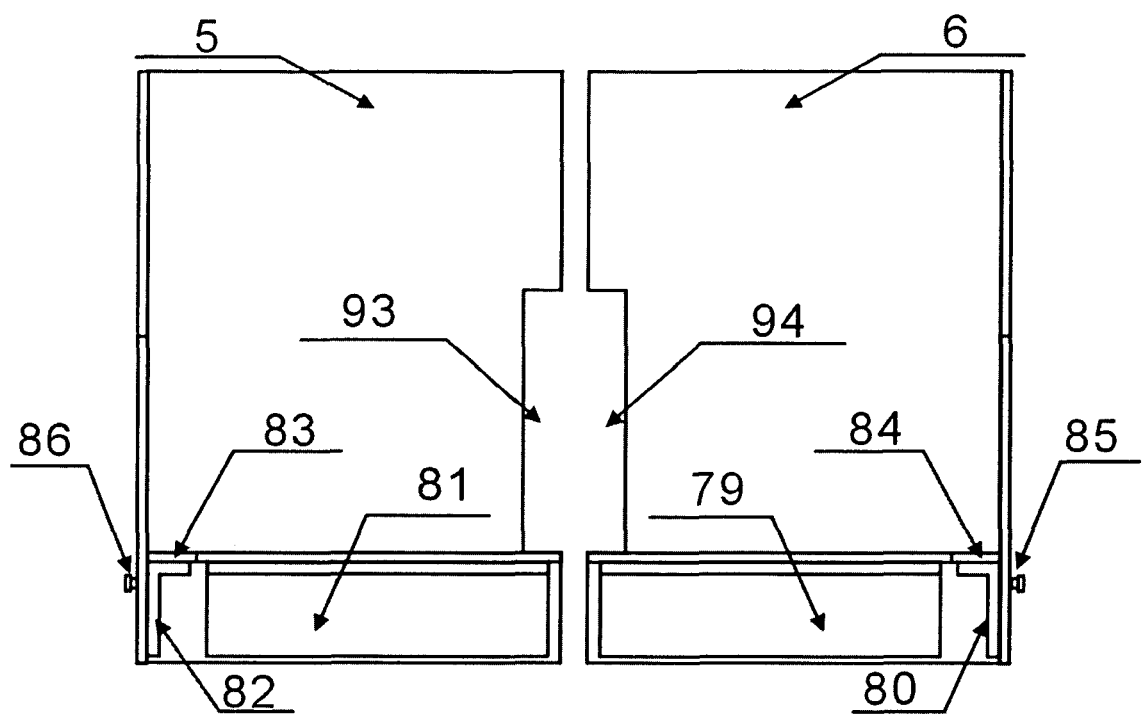
FIG. 39 is a top view of the left and right supplemental elements of the display light shield according to the above seventh preferred embodiment of the present invention.

FIG. 39 is the bottom view of the left and right supplemental elements 5, 6 according to the seventh embodiment. The left supplemental element 5 comprises a left indention opening 93, and the right supplemental element 6 comprises a right indention opening 94. When the left and right top engaging members 7, 9 of the left and right supplemental elements 5, 6 are slidably connected side-by-side, the left and right indention openings 93, 94 are aligned and coupled with each other to form an enlarged opening with the same size and position aligning with the connection opening 78 of the main element 4. Therefore, even if the two left and right supplemental elements 5, 6 are very close, connections can still be made though the left and right indention openings 93, 94 and the connection opening 78 without removing the hood body from the display.

Referring to FIG. 39, two soft plastic blocks 79, 80 are respectively provided at the positioning members which are located at inner sides of the right top engaging member 9 and the right side shielding member 10 of the right supplemental element 6 for holding at the top and right-side peripheral edges of the display respectively. Another two soft plastic blocks 81, 82 are respectively provided at the positioning members which are located at inner sides of the left top engaging member 7 and the left side shielding member 8 of the left supplemental element 5 for holding at the top and left-side peripheral edges of the display respectively. Accordingly, these soft plastic blocks between the hood body and the display provide an anti-skid surface to securely retain the hood body around the display. In this way the shield can avoid using glue or tape which will damage the surface of the display and cause environmental problems. The right supplemental element 6 comprises a right hanger 85 at the outer side of the bottom portion thereof, and the left supplemental element 5 comprises a left hanger 86 at the outer side of the bottom portion thereof.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A display light shield for shielding a display, comprising:
    a hood body adapted for encircling with a periphery of said display within said hood cavity, and has a hood cavity defining an enclosed top, two enclosed sides, and an opened bottom, wherein said hood body is adapted to selectively adjust a width thereof for fittingly matching with a width of said display, wherein said hood body comprises:
    a main element adapted for retaining at a top peripheral edge of said display, wherein said main element has a connection opening formed at a position aligning with an equipment interface formed at said top peripheral edge of said display for enabling said equipment interface being accessed without removing said hood body from said display;
    two supplemental elements, each comprising a top engaging member and a side shielding member extended from said top engaging member to form a L-shaped structure, wherein each of said supplemental elements has one or more breakable grooves spacedly formed at a bottom portion of said side shielding member, wherein said supplemental element is selectively broken at one of said breakable grooves to remove said bottom portion to adjust a height of said side shielding member corresponding to a size of said display;
    means for selectively adjusting a distance between said side shielding members, wherein said top engaging members of said supplemental elements are slidably and detachably coupling at two sides of said main element respectively, wherein said top engaging members of said supplemental elements are slid at said two sides of said main element to selectively adjust the distance between said side shielding members for retaining said side shielding members at two side peripheral edges of said display respectively, wherein a distance between said supplemental elements, which is the width of said hood body, is adjustable for fittingly matching with the width of said display;
    a top positioning member longitudinally protruded from an inner side of each of said top engaging members; and
    two side positioning members longitudinally protruded from inner sides of said side shielding members respectively, wherein said top and said side positioning members are adapted for retaining at said top and said side peripheral edges of said display respectively to stably retain said hood body in position; and
    at least a fastening element, having a predetermined elasticity, provided at said hood body for detachably coupling at a back of said display with an elastic force to stably retain said hood body in said display.

2. The display light shield, as recited in claim 1, wherein said top engaging member is detachably and slidably coupled with said side shielding member to form said respective supplemental element, wherein each of said side shielding member has a mortise slot, wherein said top engaging member comprises a mortise and tenon structure slidably and detachably coupled with said mortise slot to detachably couple said top engaging member coupled with said side shielding member.

3. The display light shield, as recited in claim 1, wherein each of said supplemental elements further has a folding groove, a top folding line, and a side folding line, wherein said folding groove is formed between said top engaging member and said side shielding member such that said top engaging member and said side shielding member are folded along said folding groove to form said L-shaped structure of said supplemental element, wherein said top folding line is formed between said top engaging member and said top positioning member such that said top positioning member is folded from said top engaging member to longitudinally protrude from said inner side of said top engaging member, wherein said side folding line is formed between said side shielding member and said side positioning member such that said side positioning member is folded from said side shielding member to longitudinally protrude from said inner side of said side shielding member.

4. The display light shield, as recited in claim 1, wherein said main element comprises an upper panel having a first screw hole form thereon, and a lower panel, having a second screw hole, overlapping underneath said upper panel to align said second screw hole with said first screw hole, wherein said top engaging member has an elongated positioning slot aligning with said first and second screw holes when said top engaging member is slidably sandwiched between said upper and lower panels, wherein a fastener is extended from said first screw hole to said second screw hole through said positioning slot to securely couple said top engaging member between said upper and lower panels in a slidably movable manner and to enable said top engaging member to adjustably slide in responsive to said positioning slot.

5. The display light shield, as recited in claim 1, wherein said top engaging member of at least one of said supplemental elements comprises an upper panel having a first screw hole formed thereon, and a lower panel, having a second screw hole, overlapping underneath said upper panel to align said second screw hole with said first screw hole, wherein said main element has an elongated positioning slot aligning with said first and second screw holes when said main element is slidably sandwiched between said upper and lower panels, wherein a fastener is extended from said first screw hole to said second screw hole through said positioning slot to securely couple said main element between said upper and lower panels in a slidably movable manner and to enable said main member to adjustably slide in responsive to said positioning slot.

6. The display light shield, as recited in claim 1, wherein said top engaging member of at least one of said supplemental elements comprises an elongated positioning slot, wherein said main element has a screw hole aligning with said positioning slot, wherein a fastener is extended from said positioning slot to said screw hole to securely couple said top engaging member with said main element in a slidably movable manner and to enable said top engaging member to adjustably slide in responsive to said positioning slot.

7. The display light shield, as recited in claim 1, wherein said main element comprises an elongated positioning slot, wherein said top engaging member of at least one of said supplemental elements has a screw hole aligning with said positioning slot, wherein a fastener is extended from said positioning slot to said screw hole to securely couple said top engaging member with said main element in a slidably movable manner and to enable said main element to adjustably slide in responsive to said positioning slot.

8. The display light shield, as recited in claim 1, wherein said main element comprises an upper panel and a lower panel overlapping underneath said upper panel, wherein said lower panel has a bolt protruding upwardly extending and aligning with a screw hole of said upper panel, wherein said top engaging member has an elongated positioning slot aligning with said screw hole when said top engaging member is slidably sandwiched between said upper and lower panels, wherein said bolt is extended to said screw hole through said positioning slot and is secured by a nut to securely couple said top engaging member between said upper and lower panels in a slidably movable manner and to enable said top engaging member to adjustably slide in responsive to said positioning slot.

9. The display light shield, as recited in claim 1, wherein said top engaging member of at least one of said left and right supplemental elements comprises an upper panel and a lower panel overlapping underneath said upper panel, wherein said lower panel has a bolt upwardly extending and aligning with a screw hole of said upper panel, wherein said main element has an elongated positioning slot aligning with said screw hole when said main element is slidably sandwiched between said upper and lower panels, wherein said bolt is extended to said screw hole through said positioning slot and is secured by a nut to securely couple said main element between said upper and lower panels in a slidably movable manner and to enable said main member to adjustably slide in responsive to said positioning slot.

10. The display light shield, as recited in claim 1, wherein said top engaging member of at least one of said supplemental elements comprises an elongated positioning slot, wherein said main element has a bolt extended to align with said positioning slot, wherein said bolt is extended through said positioning slot and is secured by a nut to securely couple said top engaging member with said main element in a slidably movable manner and to enable said top engaging member to adjustably slide in responsive to said positioning slot.

11. The display light shield, as recited in claim 1, wherein said main element comprises an elongated positioning slot, wherein said top engaging member of at least one of said supplemental elements has a bolt protruded to align with said positioning slot, wherein said bolt is extended through said positioning slot and is secured by a nut to securely couple said top engaging member with said main element in a slidably movable manner and to enable said main element to adjustably slide in responsive to said positioning slot.

12. The display light shield, as recited in claim 1, wherein said main element has two sliding slots provided at front and rear edges of said main element respectively, wherein a width of said top engaging member correspondingly matches with a distance between said sliding slots, wherein said top engaging member is slidably engaged with said sliding slots to slidably couple with said main element.

13. The display light shield, as recited in claim 1, wherein said top engaging member of at least one of said supplemental elements has two sliding slots provided at front and rear edges of said top engaging member respectively, wherein a width of said main element correspondingly matches with a distance between said sliding slots, wherein said main element is slidably engaged with said sliding slots to slidably couple with said top engaging member.

14. The display light shield, as recited in claim 1, wherein said fastening element comprises an elastic length-adjustable fastening belt having one end coupling with said hood body and an opposed end adapted for detachably coupling at said back of said display so as to ensure said hood body being stably encircled with the periphery of said display.

15. The display light shield, as recited in claim 1, wherein said fastening element comprises an elastic length-adjustable fastening belt having two ends detachably coupling with said two side shielding members respectively for extending around said back of said display so as to ensure said hood body being stably encircled with the periphery of said display.

16. The display light shield, as recited in claim 1, wherein said each of said supplemental elements comprises an indention opening facing towards each other, wherein when said top engaging members of said supplemental elements are slidably coupled side-by-side, the indention openings are aligned and coupled with each other to form an enlarged opening with the same size and position aligning with said connection opening of said main element.

* * * * *